United States Patent
Joe et al.

(10) Patent No.: US 10,547,571 B2
(45) Date of Patent: Jan. 28, 2020

(54) MESSAGE SERVICE PROVIDING METHOD FOR MESSAGE SERVICE LINKED TO SEARCH SERVICE AND MESSAGE SERVER AND USER TERMINAL TO PERFORM THE METHOD

(71) Applicant: KAKAO CORP., Jeju-si, Jeju-do (KR)

(72) Inventors: June Seong Joe, Seoul (KR); Doo Wahn Park, Paju-si (KR); Won Muk Kim, Seoul (KR); Dong Ho Shin, Seongnam-si (KR); Ji Hye Choe, Seongnam-si (KR); Seung Jin Park, Seongnam-si (KR); Hyun Hee Park, Bucheon-si (KR); Ji Eun Choi, Seongnam-si (KR); Seung Uk Seo, Seoul (KR); Yu Mi Kim, Seongnam-si (KR); Jin Woo Choi, Seoul (KR); Yang Kyun Park, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 631 days.

(21) Appl. No.: 15/147,744

(22) Filed: May 5, 2016

(65) Prior Publication Data

US 2016/0330150 A1 Nov. 10, 2016

(30) Foreign Application Priority Data

May 6, 2015 (KR) .................. 10-2015-0063383
Feb. 18, 2016 (KR) .................. 10-2016-0018951

(51) Int. Cl.
*H04L 12/58* (2006.01)
*G06F 3/0484* (2013.01)
(Continued)

(52) U.S. Cl.
CPC .......... *H04L 51/046* (2013.01); *G06F 3/0484* (2013.01); *G06F 16/248* (2019.01); *G06F 16/90324* (2019.01)

(58) Field of Classification Search
None
See application file for complete search history.

(56) References Cited

U.S. PATENT DOCUMENTS

| | | | |
|---|---|---|---|
| 2006/0026033 A1* | 2/2006 | Brydon | G06Q 10/063 705/7.11 |
| 2010/0064018 A1 | 3/2010 | Luo | |

(Continued)

FOREIGN PATENT DOCUMENTS

| | | |
|---|---|---|
| CN | 1783850 A | 6/2006 |
| CN | 1942856 A | 4/2007 |

(Continued)

OTHER PUBLICATIONS

Office Action dated Apr. 25, 2017 of corresponding Japanese Patent Application No. 2016-089493—6 pages.
(Continued)

*Primary Examiner* — Toan H Vu
(74) *Attorney, Agent, or Firm* — Knobbe Martens Olson & Bear LLP

(57) ABSTRACT

A message service providing method for a message service linked to a search service and a message server and a user terminal for performing the method are disclosed. The message service providing method includes identifying an instant message input through a message input box of a message application switching from a chat mode to a search mode or a suggested search word selected from suggested search words in a suggested search word list displayed in conjunction with the message input box, transferring, to a search server, a search request for a search word including a whole or a portion of the identified instant message or (Continued)

suggested search word in response to a user input provided to the message application, receiving search result data derived through the search word.

10 Claims, 17 Drawing Sheets

(51) Int. Cl.
*G06F 16/248* (2019.01)
*G06F 16/9032* (2019.01)

(56) References Cited

U.S. PATENT DOCUMENTS

| | | | |
|---|---|---|---|
| 2010/0138402 A1* | 6/2010 | Burroughs | G06F 17/30684 707/706 |
| 2011/0055207 A1* | 3/2011 | Schorzman | G06F 17/2235 707/723 |
| 2011/0135270 A1 | 6/2011 | Ito et al. | |
| 2012/0239673 A1* | 9/2012 | Yun | G06F 16/5866 707/758 |
| 2012/0310927 A1* | 12/2012 | Johnson | G06F 16/951 707/723 |
| 2013/0268511 A1* | 10/2013 | Bailey | G06F 16/957 707/722 |
| 2014/0068467 A1 | 3/2014 | Van et al. | |
| 2014/0330774 A1 | 11/2014 | Sun et al. | |
| 2015/0186478 A1* | 7/2015 | Yan | G06F 16/14 707/722 |
| 2015/0302096 A1* | 10/2015 | Iwasaki | G06F 16/90332 707/722 |
| 2015/0319203 A1* | 11/2015 | Jeremias | H04L 51/20 715/753 |
| 2016/0359777 A1* | 12/2016 | Tucker | H04L 51/10 |

FOREIGN PATENT DOCUMENTS

| | | |
|---|---|---|
| JP | 2011-118770 A | 6/2011 |
| JP | 2012-14675 A | 1/2012 |
| JP | 2012-27950 A | 2/2012 |
| JP | 2013-25441 A | 2/2013 |
| JP | 2014-504406 A | 2/2014 |
| JP | 2014-142919 A | 8/2014 |
| JP | 2014-533853 A | 12/2014 |
| JP | 2015-28798 A | 2/2015 |
| KR | 10-2006-0074750 A | 7/2006 |
| KR | 10-2007-0040162 A | 4/2007 |
| KR | 10-2009-0072144 A | 7/2009 |
| KR | 10-1267006 B1 | 5/2013 |
| KR | 10-2013-0058856 A | 6/2013 |
| KR | 10-2013-0127086 A | 11/2013 |
| KR | 10-2014-0013253 A | 2/2014 |
| KR | 10-2014-0103363 A | 8/2014 |
| KR | 10-2014-0132630 A | 11/2014 |
| KR | 10-2015-0045236 A | 4/2015 |

OTHER PUBLICATIONS

Office Action dated Aug. 1, 2017 of corresponding Korean Patent Application No. 10-2016-0018951—8 pages.

* cited by examiner

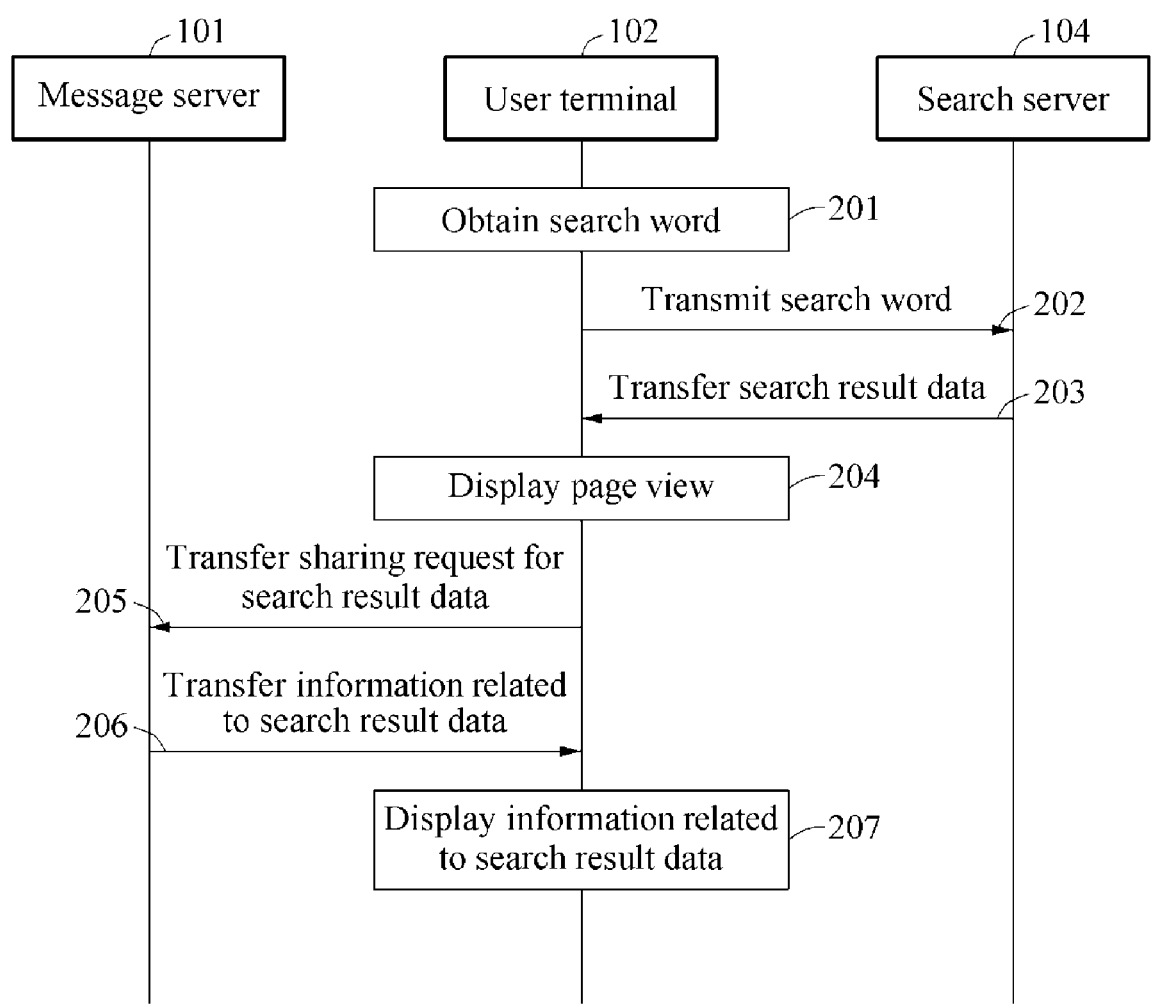

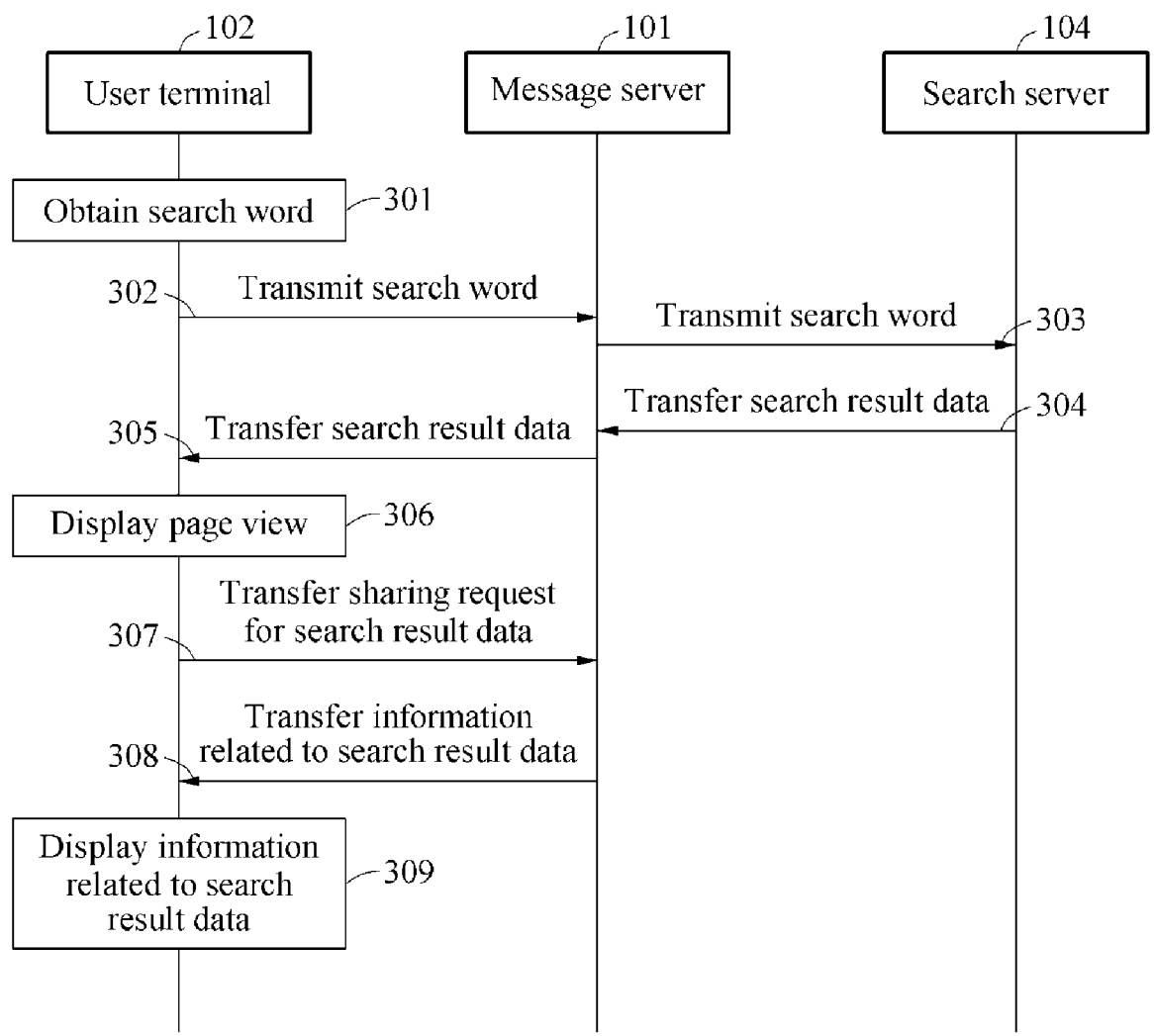

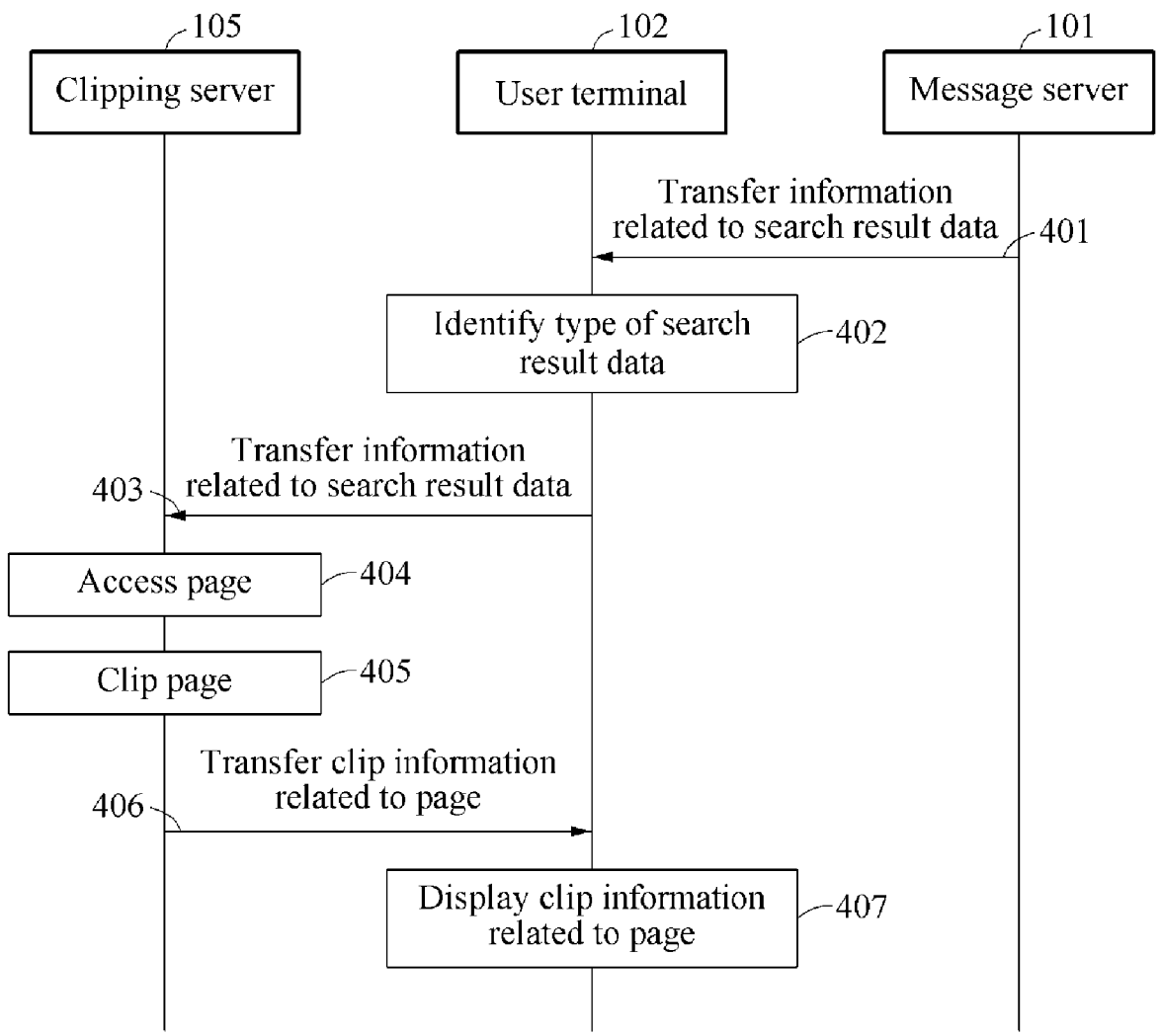

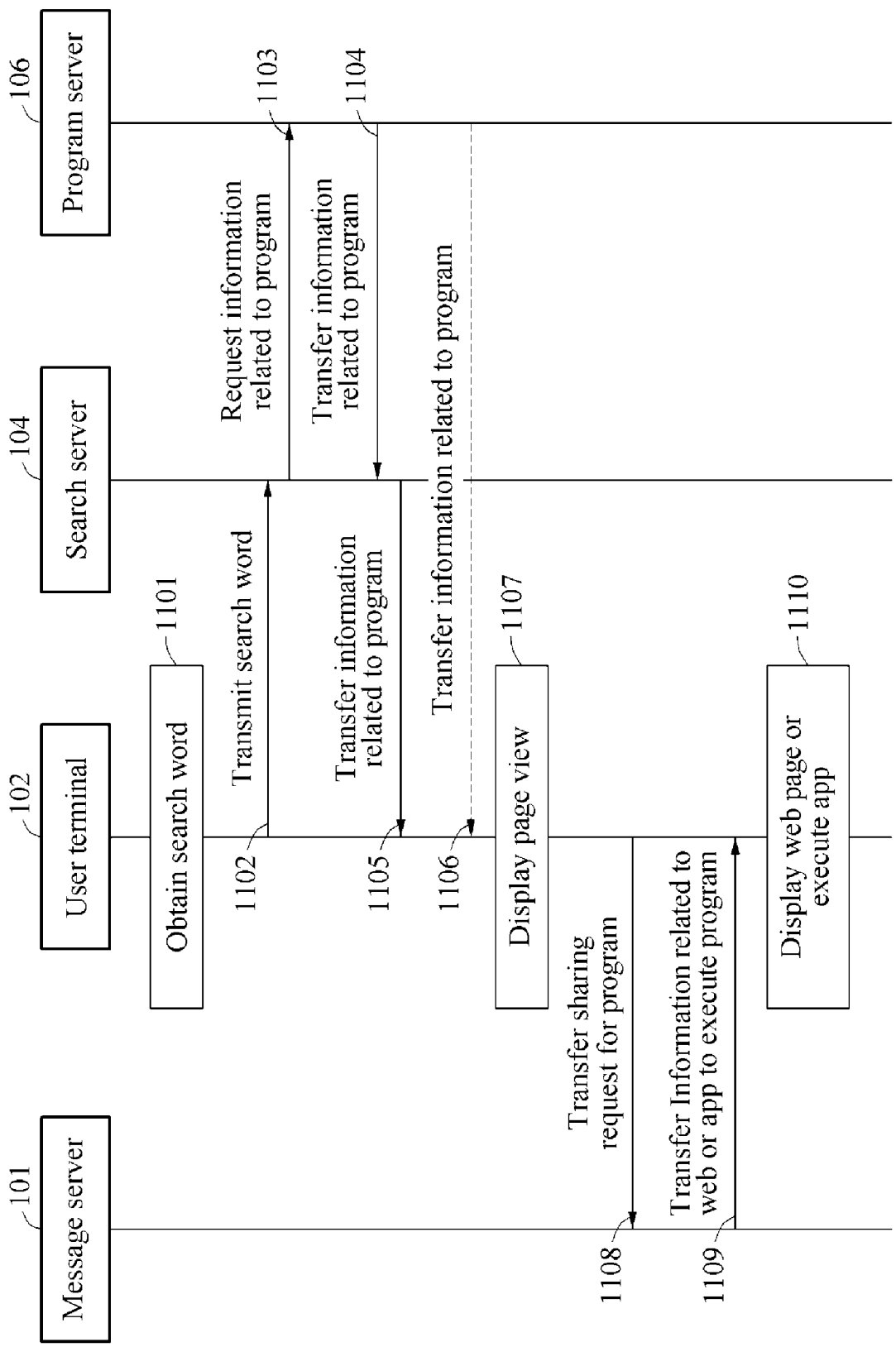

MESSAGE SERVICE PROVIDING METHOD FOR MESSAGE SERVICE LINKED TO SEARCH SERVICE AND MESSAGE SERVER AND USER TERMINAL TO PERFORM THE METHOD

CROSS-REFERENCE TO RELATED APPLICATIONS

This application claims the priority benefit of Korean Patent Application No. 10-2015-0063383, filed on May 6, 2015, and Korean Patent Application No. 10-2016-0018951, filed on Feb. 18, 2016, in the Korean Intellectual Property Office, the disclosures of which are incorporated herein by reference.

BACKGROUND

The disclosure relates to a method of providing a message service and a search service and an apparatus for performing the method.

With the recent popularization of instant message services, various functions necessary for the instant message services are suggested. An instant message service refers to a service that enables users to exchange messages in real time in a chatroom for a one-on-one chat or a group chat over a network.

SUMMARY

One aspect of the invention provides instant messaging application software for an instant messaging service which enables a search function on a messaging user interface of the instant messaging application without switching to another screen for searching, wherein the messaging user interface of the instant messaging application comprises a screen on which a user inputs text for sending and also views text received by the instant messaging application, wherein the instant messaging application initiates a searching for text inputted into the user interface of the instant messaging application without switching to another screen, wherein the instant messaging application displays a search result on the user interface of the instant messaging application without switching to another screen. In the foregoing application, the other screen may be one provided by the messaging application software. The other screen may be one provided by another application installed on the device or the operating system of the device. The foregoing instant messaging application software may be installed on any one of handheld mobile devices, wearable devices and computer devices which include smartphones, tablet computers, smartwatches, personal digital assistants and laptop or desktop computers. In the foregoing software, the search may be an internet search performed by a server remote from the device on which the software is installed. The search is performed without opening a web browser or another application installed on the device. The search result displayed on the user interface of the instant messaging application can be sent to another device without switching to another screen.

Another aspect of the invention provides a method and apparatus that may perform a search through a message application where a chat is being performed, without switching from the message application to another application for a keyword search.

Yet another aspect of the invention also provides a method and apparatus that may enable a user to select necessary search result data more conveniently by providing a result of processing search result data derived through a search word, rather than providing the search result data intactly.

Still another aspect of the invention also provides a method and apparatus that may display search result data derived through a search word in a form optimized for a chat window by displaying information related to the search result data through a speech bubble used to exchange a message in a chatroom or a template distinct from the speech bubble.

Yet another aspect also provides a method and apparatus that may access a program more conveniently through a message application by displaying a web or app where a program is to be executed as a result of searching a search word through the message application or a web browser, in a case in which the search word associated with the program is input while a chat is being performed in a chatroom through the message application.

According to an aspect, there is provided a message service providing method performed by a user terminal, the method including identifying an instant message input through a message input box of a message application switching from a chat mode to a search mode or a suggested search word selected from suggested search words in a suggested search word list displayed in conjunction with the message input box, transferring, to a search server, a search request for a search word including a whole or a portion of the identified instant message or the suggested search word in response to a user input provided to the message application, receiving search result data derived through the search word, providing a plurality of page views for each category to which the search result data is mapped, receiving a sharing request for at least one item of the search result data through the plurality of page views for each category, and displaying, at the sharing request, information related to the at least one item of the search result data in a speech bubble or a template distinct from the speech bubble in a chatroom of the message application.

The information related to the at least one item of the search result data may be determined based on information related to participants in the chatroom or information related to the chatroom when the instant message is input through the message input box or the suggested search word is selected in the suggested search word list displayed in conjunction with the message input box.

The message application may switch from the chat mode to the search mode when a user inputs an identifier or selects an identifier provided in the message application to switch from the chat mode to the search mode.

The suggested search word list may include an identifier to indicate whether the suggested search word in the suggested search word list has been selected before, or an identifier to display an additional search word including or being associated with the suggested search word in the suggested search word list.

The suggested search word list may be displayed when a user inputs the instant message into the message input box or selects the message input box before the instant message is input into the message input box, and the suggested search word list may include at least one of a related search word including or having a relation to the instant message input into the message input box, a real-time popular search word at a point in time at which the message input box is selected or the instant message is input into the message input box, a recommended search word derived by analyzing an instant message included in a chat history of the message application, a recent search word derived from an instant message recently input into the message input box, and a past search word searched through the message application.

The sharing request may include a request for sharing in at least one of a chatroom where the search request is made, another chatroom where the user is participating in a chat, another chatroom designated by the user, and a chatroom to be newly created.

The displaying may include identifying a type of the at least one item of the search result data, and displaying information related to the at least one item of the search result data in a chatroom based on the identified type.

The information related to the at least one item of the search result data may include summary data including at least one of a title, a representative image, and a description of a page corresponding to the search word.

When the at least one item of the search result data includes link information of a page corresponding to the search word, the information related to the at least one item of the search result data may correspond to clip information which is derived by analyzing the page through a clipping server, obtained from metadata of the page, or derived by snapshotting a whole or a portion of the page.

The displaying may include displaying the information related to the at least one item of the search result data in conjunction with the search word.

The at least one item of the search result data may be displayed based on a priority derived in view of at least one parameter among a recency of the at least one item of the search result data, a popularity of the at least one item of the search result data, and an association of the at least one item of the search result data with the search word.

According to another aspect, there is also provided a message service providing method performed by a user terminal, the method include recognizing an input of an identifier corresponding to one of a plurality of search servers while a user is inputting an instant message into a message input box of a message application or after the instant message input into the message input box is reflected in a chat history, transferring a search word corresponding to a whole or a portion of the instant message to the search server corresponding to the identifier when the input of the identifier is recognized, receiving search result data derived through the search word from the search server corresponding to the identifier, and displaying the search result data through a preset region of the message application.

According to still another aspect, there is also provided a message service providing method performed by a message server, the method including receiving a sharing request for at least one item of search result data from a user terminal which obtains a search word, and transferring information related to the sharing-requested at least one item of the search result data to the user terminal.

The search word may correspond to a whole or a portion of an instant message input through a message input box of a message application switching from a chat mode to a search mode or a suggested search word selected from suggested search words in a suggested search word list displayed in conjunction with the message input box.

The sharing request may be made through a plurality of page views for each category to which the search result data derived through the search word is mapped, and the information related to the at least one item of the search result data may be displayed, at the sharing request, in a speech bubble or a template distinct from the speech bubble in a chatroom of the message application of the user terminal.

The information related to the at least one item of the search result data may be determined based on information related to participants in the chatroom or information related to the chatroom when the instant message is input through the message input box or the suggested search word is selected in the suggested search word list displayed in conjunction with the message input box.

When the at least one item of the search result data includes link information of a page corresponding to the search word, the information related to the at least one item of the search result data may correspond to clip information which is derived by analyzing the page through a clipping server, obtained from metadata of the page, or derived by snapshotting a whole or a portion of the page.

According to yet another aspect, there is also provided a message service providing method performed by a user terminal, the method including obtaining link information shared between participants in a chatroom, transferring the link information to a clipping server, receiving, from the clipping server, clip information related to a page accessed through the link information, and displaying the clip information related to the page.

The displaying may include displaying the link information and the clip information related to the page together or displaying the clip information related to the page except for the link information.

According to further another aspect, there is also provided a user terminal to perform a message service providing method, the user terminal including a memory configured to store a message service providing method, and a processor configured to perform the message service providing method. The processor may be configured to identify an instant message input through a message input box of a message application switching from a chat mode to a search mode or a suggested search word selected from suggested search words in a suggested search word list displayed in conjunction with the message input box, transfer, to a search server, a search request for a search word including a whole or a portion of the identified instant message or the suggested search word in response to a user input provided to the message application, receive search result data derived through the search word, provide a plurality of page views for each category to which the search result data is mapped, receive a sharing request for at least one item of the search result data through the plurality of page views for each category, and display, at the sharing request, information related to the at least one item of the search result data in a speech bubble or a template distinct from the speech bubble in a chatroom of the message application.

According to still another aspect, there is also provided a message server to perform a message service providing method, the message server including a memory configured to store a message service providing method, and a processor configured to perform the message service providing method. The processor may be configured to receive a sharing request for at least one item of search result data from a user terminal which obtains a search word, and transfer information related to the sharing-requested at least one item of the search result data to the user terminal. The search word may correspond to a whole or a portion of an instant message input through a message input box of a message application switching from a chat mode to a search mode or a suggested search word selected from suggested search words in a suggested search word list displayed in conjunction with the message input box. The sharing request may be made through a plurality of page views for each category to which the search result data derived through the search word is mapped, and the information related to the at least one item of the search result data may be displayed, at the sharing request, in a speech bubble or a template distinct from the speech bubble in a chatroom of the message application of the user terminal.

According to yet another aspect, there is also provided a message service providing method performed by a user terminal, the method including identifying an instant message input through a message input box of a message application switching from a chat mode to a search mode or a suggested search word selected from suggested search words in a suggested search word list displayed in conjunction with the message input box, transferring, to a search server, a search request for a search word including a whole or a portion of the identified instant message or the suggested search word in response to a user input provided to the message application, receiving information related to a program provided through a web or app from a program server associated with a program corresponding to the search word, displaying a plurality of page views for each category to which the information related to the program is mapped, receiving a sharing request for at least one program through the plurality of page views for each category, receiving, at the sharing request, information related to a web or app where the at least one program is to be executed, and providing a web or app based on the information related to the web or app.

The web or app where the at least one program is to be executed may be determined differently based on information related to participants in a chatroom or information related to the chatroom where the instant message is input or the suggested search word in the suggested search word list is selected.

The program may be determined differently based on information related to participants in a chatroom or information related to the chatroom where the instant message is input or the suggested search word in the suggested search word list is selected.

According to still another aspect, there is also provided a user terminal to perform a message service providing method, the user terminal including a memory configured to store a message service providing method, and a processor configured to perform the message service providing method. The processor may be configured to identify an instant message input through a message input box of a message application switching from a chat mode to a search mode or a suggested search word selected from suggested search words in a suggested search word list displayed in conjunction with the message input box, transfer, to a search server, a search request for a search word including a whole or a portion of the identified instant message or the suggested search word in response to a user input provided to the message application, receive information related to a program provided through a web or app from a program server associated with a program corresponding to the search word, display a plurality of page views for each category to which the information related to the program is mapped, receive a sharing request for at least one program through the plurality of page views for each category, receive, at the sharing request, information related to a web or app where the at least one program is to be executed, and provide a web or app based on the information related to the web or app.

According to yet another aspect, there is also provided a user terminal to perform a message service providing method, the user terminal including a memory configured to store a message service providing method, and a processor configured to perform the message service providing method. The processor may be configured to obtain link information shared between participants in a chatroom, transfer the link information to a clipping server, receive, from the clipping server, clip information related to a page accessed through the link information, and display the clip information related to the page.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 is a diagram illustrating an example of displaying information related to search result data according to a first embodiment;

FIG. 3 is a diagram illustrating an example of displaying information related to search result data according to a second embodiment;

FIG. 4 is a diagram illustrating an operation of a clipping server according to an embodiment;

FIG. 11 is a diagram illustrating a process of providing information related to a web or app where a program is to be executed according to an embodiment;

DETAILED DESCRIPTION OF EMBODIMENTS

Reference will now be made in detail to embodiments of the present invention, examples of which are illustrated in the accompanying drawings.

Herein, the terms "include/comprise" and/or "have" specify the presence of stated features, integers, steps, operations, elements, components, and/or combinations thereof, but do not preclude the presence or addition of one or more other features, numbers, steps, operations, elements, components, and/or groups thereof.

An instant message service is provided through a message application, and various functions are added to the message application. In detail, a user participating in a chat in a chatroom often needs to search necessary information while chatting with another user.

To search necessary information while chatting, the user experiences inconvenience in switching from the message application to a separate web browser and performing a search by inputting a search word or query into the web browser.

Thus, a method of performing a search within the message application without switching from the message application to the web browser is needed.

Meanwhile, the participants chatting with each other through the message application may desire to execute a program, for example, a game, other than the message application. A method of satisfying such desire is also needed.

Figure 1:
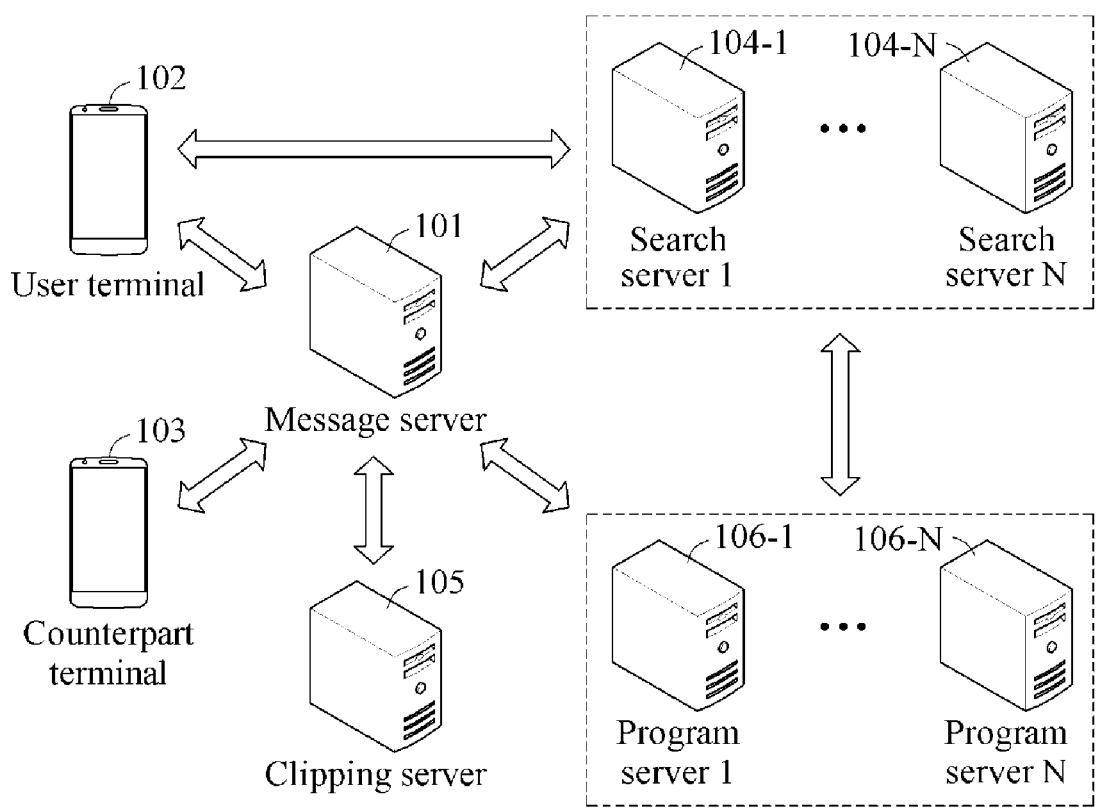
FIG. 1 is a diagram illustrating devices to perform a message service providing method according to an embodiment.

FIG. 1 is a diagram illustrating devices to perform a message service providing method according to an embodiment.

Referring to FIG. 1, a message server 101, a user terminal 102, a counterpart terminal 103, search servers 104-1 through 104-N, a clipping server 105, and program servers 106-1 through 106-M are illustrated. Herein, a terminal which performs a search through a message application may be the user terminal 102 or the counterpart terminal 103 participating in a chat in a chatroom. By displaying information related to search result data derived through a search word in a speech bubble or a template distinct from the speech bubble, search results may be verified in both the user terminal 102 and the counterpart terminal 103.

The user terminal 102 and the counterpart terminal 103 may participate in a chat in a chatroom created by the message server 101 and exchange instant messages. For the foregoing, the user terminal 102 or the counterpart terminal 103 may write an instant message through a message application distributed by the message server 101 or a server other than the message server 101.

The exchanged instant messages may be displayed in chat windows represented on displays of the user terminal 102 and the counterpart terminal 103 participating in the chat in the chatroom. The chatroom may be one of a one-on-one (1:1) chatroom and a group chatroom.

Hereinafter, a process of performing a search through a message application will be described based on the user terminal 102. The following descriptions may also be applicable to the counterpart terminal 103.

In general, a message application is an application to exchange instance messages input into message input boxes between the user terminal 102 and the counterpart terminal 103 participating in a chat in a chatroom. In an example, whether an instant message input into the message input box of the message application corresponds to general chat content or a search word needs to be verified.

In an example, in a case in which the user terminal 102 desires to perform a search through the message application, a process of switching the message application from a chat mode to a search mode may be needed. An instant message input through the message input box displayed in the chat window of the message application after the message application switches from the chat mode to the search mode may be utilized as a search word. The foregoing will be described in detail with reference to FIGS. 5A and 5B.

In another example, in a case in which the user terminal 102 desires to perform a search through the message application, a search request may be immediately generated to perform a search using an instant message input into the message application, without switching the message application to the search mode. The foregoing will be described in detail with reference to FIGS. 6A and 6B.

The user terminal 102 may identify an instant message input through the message input box of the message application. Further, the user terminal 102 may identify a suggested search word selected from suggested search words in a suggested search word list displayed in conjunction with the message input box. The user terminal 102 may transfer, to a search server, a search request for a search word including a whole or a portion of the identified instant message or the suggested search word in response to a user input provided to the message application.

Here, the suggested search word list may be displayed to overlay the message input box or displayed in a region adjacent to the message input box in a case in which a user input, for example, a touch, a drag, or a swipe, is provided in a situation in which an input is yet to be provided into the message input box. In another example, the suggested search word list may be displayed to overlay the message input box or displayed in a region adjacent to the message input box in a case in which a user inputs an instant message into the message input box. Each time a keyword constituting the instant message is input, the suggested search word list may change based on the keyword.

The user terminal 102 may transfer the search word input into the message application to one or each of the plurality of search servers 104-1 through 104-N. In this example, the user terminal 102 may generate a search query including the search word and transfer the search query to one or each of the plurality of search servers 104-1 through 104-N.

In an example, the user terminal 102 may transfer the search word to a gateway server connected to the plurality of search servers 104-1 through 104-N. The gateway server may transfer the search word to the plurality of search servers 104-1 through 104-N. The gateway server may collect search result data from the plurality of search servers 104-1 through 104-N and transfer the search result data to the user terminal 102.

In another example, the user terminal 102 may transfer the search word directly to the plurality of search servers 104-1 through 104-N, rather than through the gateway server. In still another example, the user terminal 102 may transfer the search word to the message server 101. The message server 101 may transfer the received search word to one or each of the plurality of search servers 104-1 through 104-N. In this example, the message server 101 may transfer the received search word to one or each of the plurality of search servers 104-1 through 104-N through the gateway server. In addition, in a case in which a search server is designated separately by the user, the user terminal 102 may transfer the search word to the designated search server.

The user terminal 102 may receive search result data directly from one or each of the plurality of search servers 104-1 through 104-N, or through the gateway server or the message server 101. A plurality of items of search result data may be derived through the search word.

The search result data may include at least one of link information, for example, a uniform resource locator (URL), to access a web page corresponding to the search word and collected information crawled from the web page corresponding to the search word. The search result data may be classified by categories such as news, images, videos, blogs, cafés, books, shopping, and music, for example.

In an example, the user terminal 102 may share the information related to the search result data in the chatroom. The user terminal 102 may display the information related to the search result data intactly in the chatroom accessed through the message application.

The information related to the search result data may be shared in at least one of a chatroom where the search request is made, another chatroom where the user terminal 102 is participating in a chat, another chatroom designated by the user, and a chatroom to be newly created. In this example, the user terminal 102 may display information related to at least one item of search result data corresponding to a predetermined category in the chatroom.

In another example, the user terminal 102 may display a plurality of page views for each category to which the search result data derived through the search word is mapped. In detail, the user terminal 102 may enable the user to select search result data belonging to the predetermined category by processing the search result data derived through the search word and displaying the plurality of page views for each category to which the search result data is mapped.

Here, a page view refers to an interface that displays search result data mapped so that the user may select search result data derived from a search word set using the instant message input through the message application or the suggested search word selected in the suggested search word list.

The user terminal 102 may display the page views to which the search result data is mapped on an upper layer of the chat window. The user terminal 102 may process the search result data in a form optimized for the chatroom and display the search result data through the page views. A category of the page views to which the search result data is mapped may be determined based on a category of the search result data. In detail, the user terminal 102 may display the plurality of page views for each category to which the search result data is mapped.

In an example, in a case in which the user makes a sharing request for at least one item of the search result data displayed on a page view of a predetermined category through the plurality of page views for each category, the user terminal 102 may transfer the sharing request for the at least one item of the search result data to the message server 101 or at least one search server. The message server 101 may transfer a message including information related to the at least one item of the search result data to the chatroom. In this example, the information related to the search result data may include summary data including at least one of a title, a representative image, a description, and a link of the search result data.

The user terminal 102 may verify a form of a template or a speech bubble in which the information related to the search result data is to be displayed based on a type of the search result data. The user terminal 102 may expose the template or the speech bubble in which the information related to the search result data is displayed in the chatroom related to the sharing request.

In this example, the user terminal 102 may display the information related to the at least one item of the search result data and the search word together. The user terminal 102 may display the information related to the search result data and the search word together, thereby enabling the user to easily verify a search word used to derive the information related to the search result data.

In an example, in a case in which the sharing request for the information related to the search result data is to be transferred to a search server 104, the information related to the search result data may be transferred to the search server 104 along with information related to the chatroom or information related to participants in the chatroom. In another example, when the information related to the search result data is displayed, the information related to the chatroom or the information related to the participants in the chatroom may be transferred from the message server 101 to the user terminal 102.

Meanwhile, in a case in which search result data obtained when a search is performed using a search word in the search server 104 is associated with a program provided through a web or app, the user terminal 102 may display a web page where the program is to be executed, the web page provided by a program server, through the message application or the web browser, or display an app where the program is to be executed.

Here, in a case in which the user terminal 102 accesses the chatroom through the message application, the search word may be a whole or a portion of the instant message input into the message input box of the chatroom. In another example, the search word may be a suggested search word selected from the suggested search words in the suggested search word list displayed in conjunction with the message input box.

In this example, although a program corresponding to the search word is not installed in the user terminal 102, the user terminal 102 may execute the program through the web or app. Meanwhile, the web or app where the program is to be executed may be a result reflecting the information related to the chatroom where the search is performed or the information related to the participants in the chatroom where the search is performed.

In an example, the user terminal 102 may share, with the counterpart terminal 103 through the chatroom, the search result data derived by performing a search in the message application while chatting with the counterpart terminal 103 through the message application in real time. Thus, the user terminal 102 may directly perform a search through the message application where a chat is currently being performed, without the necessity of switching from the message application to an application to perform a search, for example, the web browser. According to an embodiment, by providing search result data through page views, the user may select the search result data more conveniently.

According to another embodiment, the search result data may be displayed through a speech bubble or a template optimized for a chatroom of a user terminal. Thus, the search result data may be shared in the chatroom non-disparately.

Meanwhile, in a case in which the search word input through the message application is mapped to the program to be executed in the web or app, the user terminal 102 may display the web page where the program is to be executed, or execute the program through the app. In this example, the web or app where the program is to be executed may be determined differently based on the information related to the chatroom where the user terminal 102 is participating in a chat or the information related to the participants in the chatroom.

FIG. 2 is a diagram illustrating an example of displaying information related to search result data according to a first embodiment.

Referring to FIG. 2, in operation 201, the user terminal 102 may obtain a search word through a message application. In this example, the user terminal 102 may identify an instant message input through a message input box of the message application or a suggested search word selected from suggested search words in a suggested search word list displayed in conjunction with the message input box. The user terminal 102 may obtain a whole or a portion of the identified instant message or the suggested search word as the search word in response to a user input provided to the message application.

In an example, the user terminal 102 may obtain a whole or a portion of the instant message input into the message input box as the search word after the message application switches from a chat mode to a search mode. In another example, the user terminal 102 may obtain, as the search word, a whole or a portion of the suggested search word selected from the suggested search word in the suggested search word list displayed in conjunction with the message input box after the message application switches from the chat mode to the search mode.

In still another example, in a case in which a search request for the instant message input into the message input box is made, the user terminal 102 may obtain the instant message included in the search request as the search word.

In operation 202, the user terminal 102 may transmit, to the search server 104, the search request including the search word set using a whole or a portion of the identified instant message or the suggested search word through the message application. Here, the search request may be a request to transfer a whole or a portion of the instant message input into the message input box to the search server after an identifier to switch the message application to the search mode is selected or input.

In another example, the search request may be a request to transfer a whole or a portion of the instant message to the search server in a case in which an identifier with respect to the search request is selected while the instant message is being input into the message input box of the message application or after the instant message is reflected in a chat history. The search request may be a request to transfer, to the search server, the suggested search word selected in the suggested search word list displayed in conjunction with the message input box.

The search request may include information related to a chatroom where the search is performed or information related to participants in the chatroom where the search is performed, in addition to the search word.

In operation 203, the search server 104 may transfer a plurality of items of search result data corresponding to the search word to the user terminal 102. In this example, the plurality of items of search result data may be generated based on the received information related to the chatroom where the search is performed or the received information related to the participants in the chatroom where the search is performed.

In operation 204, the user terminal 102 may display a page view where the search result data is exposed. The items of the search result data derived through the search word may be mapped to a plurality of page views for each category and provided. Here, a category of the page views may be set to correspond to a category to which the search result data is mapped. In detail, when a user input, for example, a drag or a swipe, is applied to the plurality of page views for each category, page views to which search result data belonging to different categories is mapped may switch from one to another in response to the user input and displayed on a display.

In operation 205, the user terminal 102 may transfer a sharing request for at least one item of the search result data to the message server 101 through the plurality of page views for each category.

In operation 206, the message server 101 may transfer information related to the sharing-requested at least one item of the search result data to the user terminal 102. In this example, the message server 101 may transfer the information related to the sharing-requested search result data to the chatroom. When the information related to the search result data is shared, the information related to the chatroom or the information related to the participants in the chatroom may be transferred.

In operation 207, the user terminal 102 may display the information related to the at least one item of the search result data. In an example, the user terminal 102 may display the information related to the at least one item of the search result data through a speech bubble or a template distinct from the speech bubble in the chatroom where the search word is obtained or in a chatroom related to the sharing request. In another example, the user terminal 102 may display the information related to the search result data through a web browser separate from the message application.

Meanwhile, the user terminal 102 may identify a type of the search result data received from the message server 101. The user terminal 102 may determine a form of the speech bubble or the template where the search result data is to be displayed based on the identified type of the search result data. The foregoing will be described with reference to FIG. 11.

FIG. 3 is a diagram illustrating an example of displaying information related to search result data according to a second embodiment.

Unlike FIG. 2, FIG. 3 illustrates a process of transferring a search word from the user terminal 102 to the search server 104 through the message server 101.

Referring to FIG. 3, in operation 301, the user terminal 102 may obtain a search word through a message application. In this example, the user terminal 102 may identify an instant message input through a message input box of the message application or a suggested search word selected from suggested search words in a suggested search word list displayed in conjunction with the message input box. The user terminal 102 may obtain a whole or a portion of the identified instant message or the suggested search word as the search word in response to a user input provided to the message application.

In an example, the user terminal 102 may obtain a whole or a portion of the instant message input into the message input box as the search word after the message application switches from a chat mode to a search mode. In another example, the user terminal 102 may obtain, as the search word, a whole or a portion of the suggested search word selected from the suggested search words in the suggested search word list displayed in conjunction with the message input box after the message application switches from the chat mode to the search mode.

In still another example, in a case in which a search request for the instant message input into the message input box is made, the user terminal 102 may obtain the instant message included in the search request as the search word.

In operation 302, the user terminal 102 may transmit the search request including the search word to the message server 101. In this example, the user terminal 102 may transfer the search word and a search indicator to the message server 101 to distinguish the search word from a message to be transmitted to the message server 101 through the message application. Here, the search indicator may be at least one of a symbol, a number, a character, and a figure indicating that the instant message obtained through the message application is not a general message exchanged with participants through a chatroom, but a search word.

In operation 303, the message server 101 may transfer the search request received from the user terminal 102 to the search server 104. In this example, information related to a chatroom where a search is performed or information related to the participants in the chatroom where the search is performed may be transferred along with the search word.

In operation 304, the search server 104 may transfer a plurality of items of search result data corresponding to the search word to the message server 101. In operation 305, the message server 101 may transfer the plurality of items of the search result data received from the search server 104 to the user terminal 102. Unlike operations 304 and 305, the search server 104 may transfer the search result data directly to the user terminal 102, rather than through the message server 101.

In this example, the search result data may be generated based on the received information related to the chatroom where the search is performed or the received information related to the participants in the chatroom where the search is performed.

In operation 306, the user terminal 102 may display a page view to which the search result data is mapped. The items of the search result data derived through the search word may be mapped to a plurality of page views for each category and provided.

In operation 307, the user terminal 102 may transfer a sharing request for the search result data exposed through the page view to the message server 101.

In operation 308, the message server 101 may transfer information related to the sharing-requested search result data to the user terminal 102. In this example, the message server 101 may transfer the information related to the sharing-requested search result data to a target terminal with which the search result data is to be shared. When sharing is requested, the information related to the chatroom or the information related to the participants in the chatroom may be transferred.

In operation 309, the user terminal 102 may display the information related to the search result data. In an example, the user terminal 102 may display the information related to the search result data through a speech bubble or a template distinct from the speech bubble in the chatroom where the search word is input or in a chatroom related to the sharing request. In another example, the user terminal 102 may display the information related to the search result data through a web browser separate from the message application.

Meanwhile, the user terminal 102 may identify a type of the search result data received from the message server 101. The user terminal 102 may determine a form of the speech bubble or the template where the search result data is to be displayed based on the identified type of the search result data.

In FIGS. 2 and 3, the search server 104 may transfer at least one of the plurality of items of search result data to the message server 101 or the user terminal 102 based on at least one parameter among a recency, a popularity, and an association with the search word. In a case in which the plurality of items of search result data is derived, the information related to the search result data may be transferred to the message server 101 or the user terminal 102 in a form of search collection.

The recency is an attribute indicating a measure of a time elapsed to generate the search result data since the search was performed by inputting the search word into the message input box. The popularity is an attribute indicating a frequency of the search result data derived from the search word being selected by a user, for example, page access, or whether the search result data has been utilized, for example, membership join, product purchase, and the like. The association with the search word is an attribute indicating a level of correlation between the search word and the search result data derived from the search word.

In detail, the search result data may be selected based on a priority derived in view of at least one parameter among the recency of the search result data, the popularity of the search result data, and the association of the search result data with the search word. In this example, a possibility of the search result data being provided to the user terminal 102 may increase as the recency, the popularity, or the association with the search word increases.

FIG. 4 is a diagram illustrating an operation of a clipping server according to an embodiment.

FIG. 4 illustrates a case in which information related to search result data includes link information to access a web page. When the user terminal 102 transfers the link information included in the information related to the search result data to the clipping server 105, the clipping server 105 may access a web page corresponding to the link information to obtain clip information related to the web page. Such link information may be transferred from the message server 101, rather than the user terminal 102, directly to the clipping server 105.

In FIG. 4, a process of providing, to the user terminal 102, the clip information related to the web page obtained by the clipping server 105 accessing the web page corresponding to the search word through the link information is illustrated.

In operation 401, the user terminal 102 may receive information related to search result data. In an example, the information related to the search result data may be transferred at a sharing request for the search result data through a page view to which the search result data is mapped. A process performed until the information related to the search result data is received may correspond to operations 201 through 206 of FIG. 2 or operations 301 through 308 of FIG. 3.

In operation 402, the user terminal 102 may identify a type of the search result data received from the message server 101.

In this example, in a case in which the information related to the search result data includes link information to access a web page corresponding to the search word, the user terminal 102 may transfer the information related to the search result data or the link information included in the information related to the search result data to the clipping server 105, in operation 403.

In operation 404, the clipping server 105 may access the page corresponding to the search word through the link information. In operation 405, the clipping server 105 may obtain clip information related to the page by clipping the page. The clip information may refer to constituents of the page, for example, a text, an image, and a video. In detail, the clip information may refer to metadata including at least one of a title, a description, and a representative image of the page extracted by the clipping server 105 from the page corresponding to the link information. Here, a process of clipping the page by the clipping server 105 may be performed as follows.

(i) Page Analysis

The clipping server 105 may obtain clip information related to the page, for example, a title, a brief description, and a representative image of the page, by analyzing the page accessed through the link information. In detail, the clipping server 105 may obtain, from the page, the clip information such as the title, the brief description, and the representative image of the page by parsing a hypertext markup language (HTML) of the page.

(ii) Page Metadata Use

The clipping server 105 may obtain the clip information from metadata of the page. The metadata of the page may be expressed in a form of codes on the page.

(iii) Page Snapshot

The clipping server 105 may obtain an image of the page as the clip information related to the page by capturing a whole or a portion of the page. In detail, the clipping server 105 may obtain the image of the page as the clip information related to the page by snapshotting a whole or a portion of the page accessed through the link information.

In operation 406, the clipping server 105 may transfer the clip information related to the page to the user terminal 102. In operation 407, the user terminal 102 may display the clip information in the chatroom. In this example, the user terminal 102 may display the clip information through a speech bubble or a template distinct from the speech bubble in the chatroom.

Referring to FIG. 4, a case in which the user terminal 102 identifies the type of the search result data is illustrated. However, in an example, unlike operations 401 and 402, the message server 101 may directly identify the type of the search result data. In a case in which the search result data includes link information to access a web page, the message server 101 may transfer the link information directly to the clipping server 105. In this example, the clipping server 105 may access the page corresponding to the link information, clip the page to obtain clip information related to the page, and transfer the obtained clip information to the user terminal 102 directly or through the message server 101.

In a case in which the information related to the search result data includes the link information of the web page corresponding to the search word, the user terminal 102 may display, in the chat window, summary information of the page to be accessed through the link information, or the link information and the summary information of the page to be accessed through the link information. Here, the summary information of the page may be determined based on the clip information collected by the clipping server 105.

In an example, in addition to a case in which the link information is included in the search result data derived through the search request in the message application, the link information such as a URL may be shared between participants in the chatroom of the message application, irrespective of a search. In this example, the link information shared in the chatroom of the message application may be transferred from the user terminal 102 directly to the clipping server 105 or transferred from the user terminal 102 to the clipping server 105 through the message server 101.

The clipping server 105 may access the page through the link information received from the user terminal 102, obtain clip information related to the page by clipping the page, and transfer the clip information related to the page directly to the user terminal 102 or to the user terminal 102 through the message server 101. Here, the clip information may include at least one of a title, a description, and a representative image of the page.

The link information shared between the participants in the chatroom and the clip information related to the page received from the clipping server 105 may be displayed together in the chatroom. In another example, instead of the link information, only the clip information related to the page may be displayed in the chatroom.

Figure 5A:
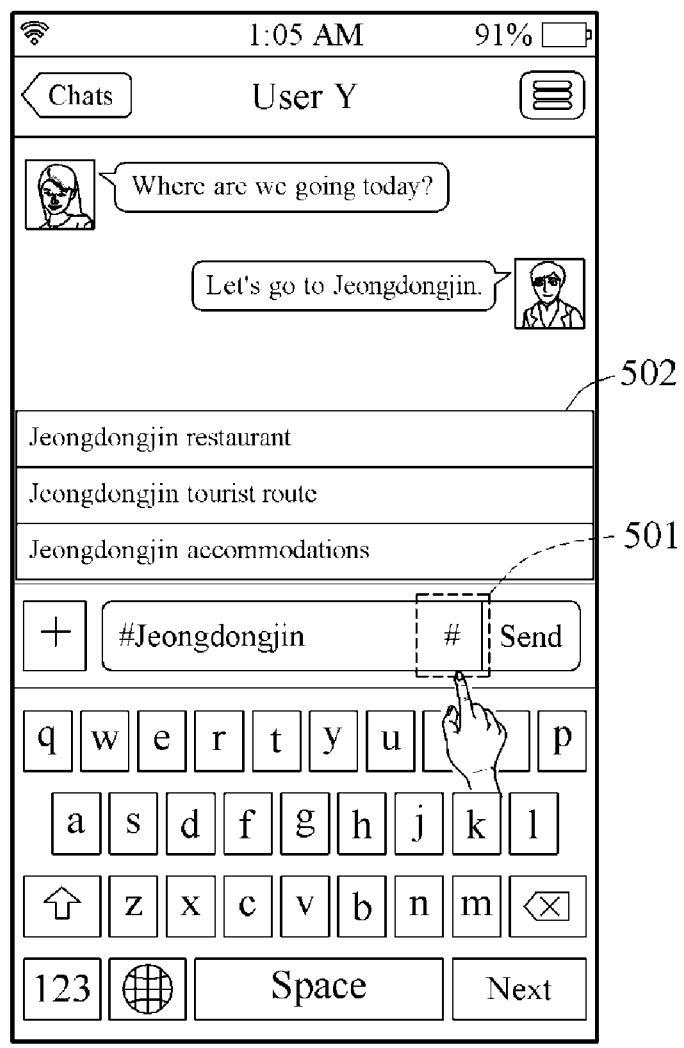
FIGS. 5A and 5B illustrate a process of performing a search through a message application according to the first embodiment.
Figure 5B:
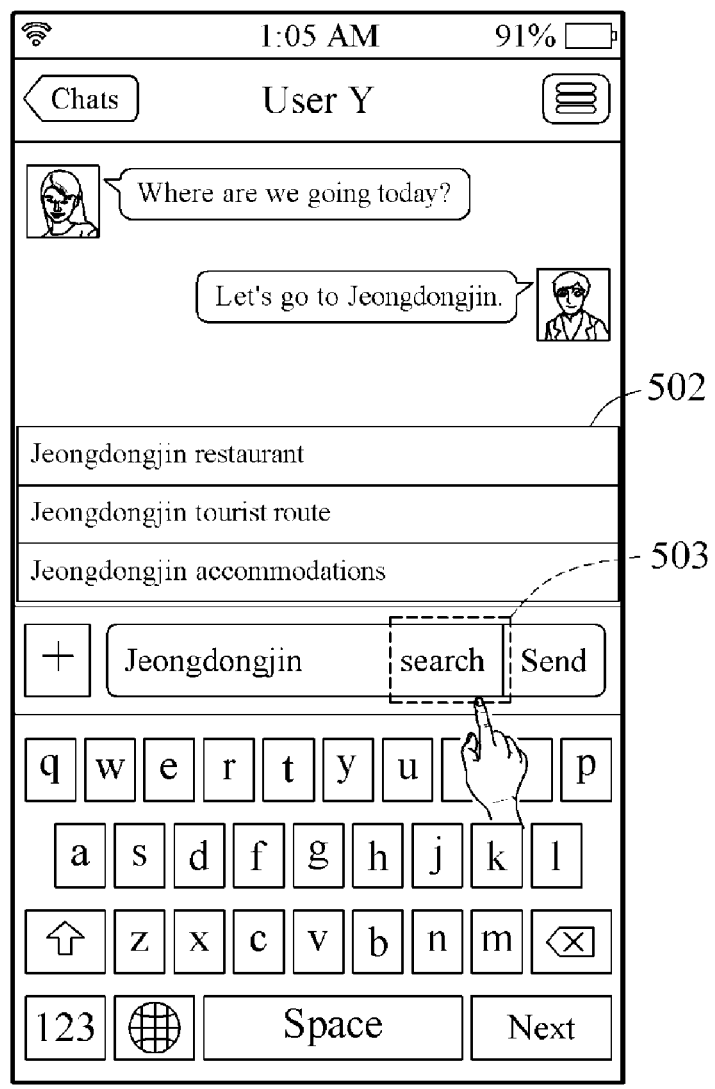

FIGS. 5A and 5B illustrate a process of performing a search through a message application according to the first embodiment.

FIG. 5A illustrates a process of switching a message application from a chat mode to a search mode.

Referring to FIG. 5A, an identifier 501, for example, #, to switch a message application from a chat mode to a search mode is displayed in a message input box displayed in a chatroom. In this example, when a user selects the identifier 501, the message application may switch from the chat mode to the search mode. In embodiments, when the message application switches from the chat mode to the search mode, a "send" button in the message input box may be changed to a "search" button, or changed into an image related to "search", for example, a magnifying glass icon.

Meanwhile, when the message application switches from the chat mode to the search mode, a character # related to the search mode may be provided as a default in the message input box. In this example, the character related to the search mode may be a symbol or a character including at least one word designated separately by the user or the message application.

In another example, when the user directly inputs an identifier such as a hash tag # into the message input box rather than selecting the identifier 501, the message application may automatically switch from the chat mode to the search mode.

FIG. 5B illustrates a process of setting an instant message as a search word and requesting a search.

In FIG. 5B, an identifier 503 to set an instant message input into the message input box as a search word and request a search, without the necessity of switching the message application from the chat mode to the search mode, is illustrated. When the user simply inputs an instant message corresponding to a search word into the message input box and selects the identifier 503, the user terminal 102 may transfer a search request for the instant message to the search server 104.

Meanwhile, the identifier 503 may correspond to a single search server. In another example, the identifier 503 may extend to correspond to a plurality of search servers. For example, when the user clicks the identifier 503, the identifier 503 may extend and icons corresponding to the plurality of search servers may be displayed. The user may select one icon to designate a search server to perform a search using the instant message set as the search word.

In FIGS. 5A and 5B, when the identifier 501 or the identifier 503 is selected in a situation in which a search word is yet to be input into the message input box, a last message among messages displayed in the chat window may be determined to be the search word.

In FIGS. 5A and 5B, a suggested search word list 502 is illustrated. The user terminal 102 may display the suggested search word list 502 in conjunction with the message input box. In detail, the suggested search word list 502 may be displayed when the user touches or drags the message input box in a situation in which an instant message is yet to be input into the message box. In another example, the suggested search word list 502 may be displayed in response to an instant message being input into the message input box. In this example, when content of the instant message changes, the suggested search word list 502 may adaptively change based on the changed content of the instant message. The suggested search word list 502 may be displayed when an instant message is input into the message input box, or when the message input box is selected before an instant message is input into the message input box.

In FIGS. 5A and 5B, the suggested search word list 502 may be displayed right above the message input box. However, embodiments are not limited thereto. The suggested search word list 502 may be displayed at a position adjacent to the message input box, or at a position somewhat spaced apart from the message input box. The suggested search word list 502 may also be displayed to overlay the message input box.

In embodiments, an identifier to indicate whether a suggested search word in the suggested search word list has been selected before may be displayed. For example, in a case in which a suggested search word in the suggested search word list has been used by the user as a search word before, a predetermined symbol may be displayed in a vicinity of the suggested search word.

Further, an identifier to display an additional search word including or being associated with a suggested search word in the suggested search word list may be displayed. For example, the suggested search words in the suggested search word list may correspond to "car", "color", and "clean". When an identifier associated with "car" is selected, the suggested search word list may include only suggested search words including or being associated with "car".

In an example, the suggested search word list 502 may include at least one of a related search word including or having a relation to an instant message input into the message input box, a real-time popular search word at a point in time at which the message input box is selected or an instant message is input into the message input box, a recommended search word derived by analyzing an instant message included in a chat history of the message application, a recent search word derived from an instant message recently input into the message input box, and a past search word searched through the message application. The suggested search word list may be obtained from the search server 104. In an example, the suggested search word list may be obtained from a search history stored in the user terminal 102 actually used to perform a search.

Furthermore, when the user selects the message input box in a situation in which a search word is yet to be input into the message input box, the suggested search word list 502 may be displayed. In this example, since a search word is yet to be input into the message input box, the suggested search word list 502 may include suggested search words such as the real-time popular search word, the recommended search word, and the recent search word, excluding the related search word.

The related search word may be a search word in the similar sense to a keyword input into the message input box after the message application switches to the search mode, or a search word generated by adding at least one keyword before or after a keyword input into the message input box. In another example, the related search word may be another keyword input within a predetermined period of time after a keyword is input into the message input box. Such a keyword may be determined based on a time interval between statistically collected keywords. In detail, when a search is performed using a keyword "bed credit" immediately after a keyword "loan" is input, "loan" and "bed credit" may have an association with each other.

The real-time popular search word may be a popular search word provided through a web portal at a point in time a keyword is input into the message input box after the message application switches to the search mode. The real-time popular search word may change based on a point in time at which a keyword is input into the message input box.

The recommended search word may be a search word derived by analyzing content of a message input before the message application switches to the search mode. In this example, the recommended search word may be derived by dividing content of messages transferred and received between participants in a chatroom based on a time interval. Content of a message may be divided into a plurality of keywords through syntax analysis. The user terminal 102 may set, as the recommended search word, a keyword utilized as a search word or having a possibility of being used as a search word, among the plurality of keywords, by applying natural language processing, machine learning, or statistics technique to the plurality of extracted keywords.

The recent search word may be a search word most recently input based on a point in time at which a search word is input into the message input box after the message application switches to the search mode. A temporal reference with respect to the term "recent" may be set differently for each search server 104 or user terminal 102, or may be determined based on settings defined by the user.

The past search word may be a search word used by the user to obtain information related to the search result data before the message application switches from the chat mode to the search mode in response to a user input.

A number of suggested search words to be provided in the suggested search word list 502 may be adjusted based on a size of a display of the user terminal 102. For example, when the user terminal 102 has a relatively small display like a mobile terminal, a fewer number of suggested search words may be included in the suggested search word list 502, when compared to a case in which the user terminal 102 has a relatively large display like a monitor connected to a desktop computer.

In addition, a limited number of suggested search words may be included in the suggested search word list 502. Thus, the user terminal 102 may arrange the related search word, the recommended search word, and the real-time popular search word to be included in the suggested search word list 502 based on parameters, for example, similarities with a keyword input into the message input box or a number of times being selected statistically as a search word, and include a predetermined number of search words in the suggested search word list 502.

Figure 6A:
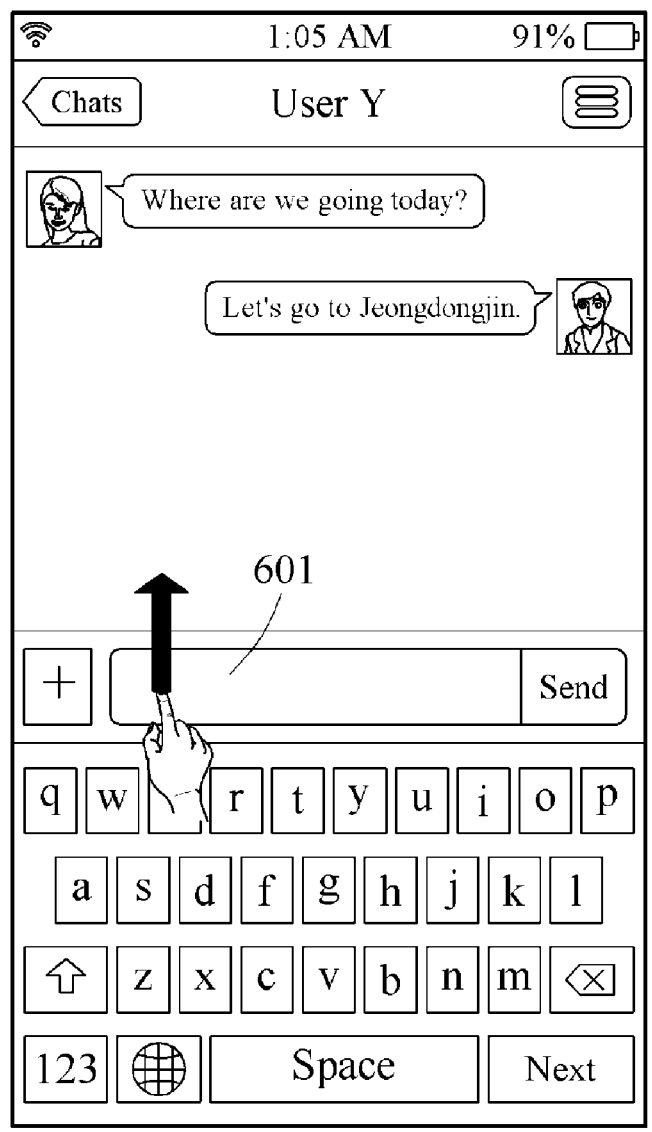
FIGS. 6A and 6B illustrate a process of performing a search through a message application according to the second embodiment.
Figure 6B:
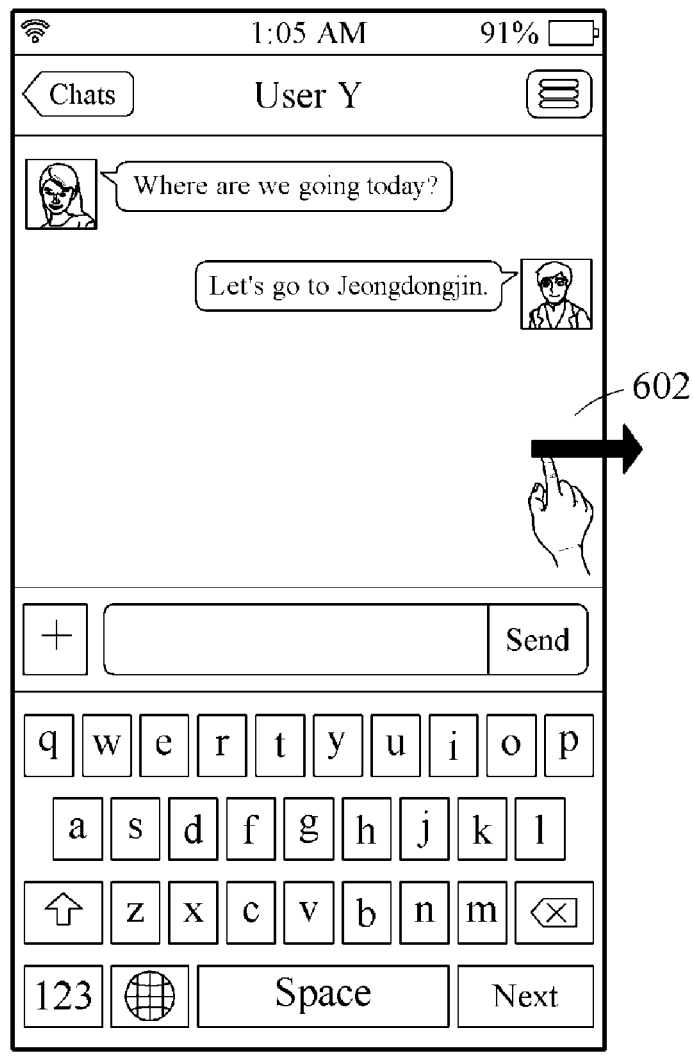

FIGS. 6A and 6B illustrate a process of performing a search through a message application according to the second embodiment.

In FIGS. 6A and 6B, a process of switching a chat window to a search mode in response to a user interaction with respect to the chat window, among user inputs, is illustrated.

FIG. 6A illustrates a process of switching from a chat mode to a search mode when the user swipes in a predetermined direction, for example, in an upward, downward, leftward, rightward, or diagonal direction, from a message input box 601. FIG. 6B illustrates a process of switching from the chat mode to the search mode when the user swipes in the predetermined direction from an edge 602 of the chat window.

When the chat window switches to the search mode in response to the process of FIG. 6A or 6B being performed, the user terminal 102 may express that the chat window has switched to the search mode in various manners. In an example, the user terminal 102 may display a notice with respect to the search mode, the notice saying "Now in search mode" at an upper end of the chat window, or change a button for transferring a keyword input into the message input box to a button indicating a search, whereby the user may recognize that the chat window has switched to the search mode.

In another example, the user terminal 102 may display a character related to the search mode as a default in the message input box 601, whereby the user may recognize that the keyword input into the message input box 601 is not a message to be transmitted to a counterpart, but a search word.

When a keyword is input into the message input box 601 after the chat window switches to the search mode in response to the user interaction as shown in FIGS. 6A and 6B, the suggested search word list 502 may be displayed in conjunction with the message input box 601 as shown in FIGS. 5A and 5B.

Figure 7A:
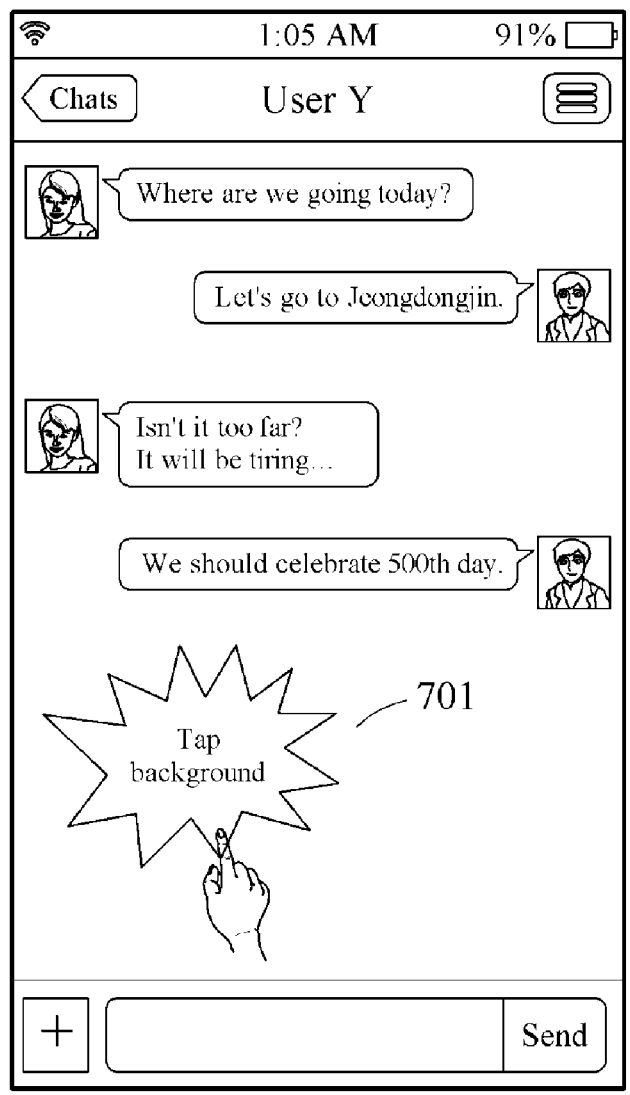
FIGS. 7A and 7B illustrate a process of performing a search through a message application according to a third embodiment.
Figure 7B:
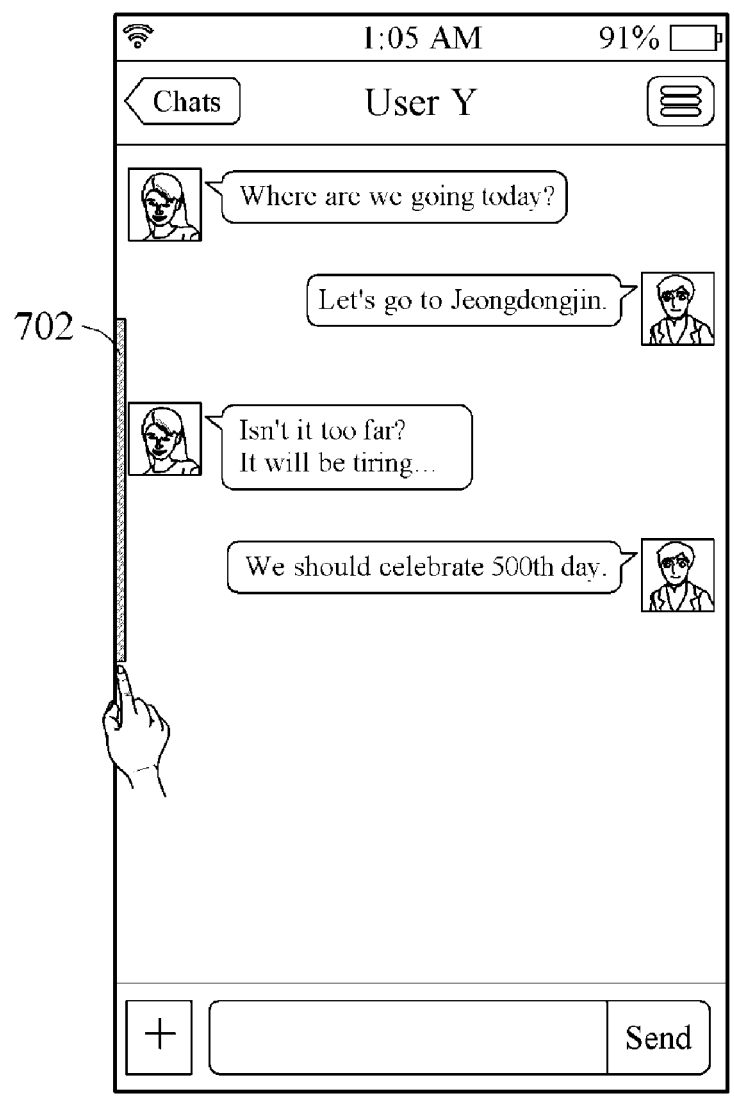

FIGS. 7A and 7B illustrate a process of performing a search through a message application according to a third embodiment.

In FIG. 7A, a process of switching a chat window to a search mode when a user taps a background 701, for example, a wallpaper of the chat window, is illustrated. Here, the wallpaper 701 may refer to a remaining region excluding messages displayed in the chat window. Although tapping is performed in the example of FIG. 7A, various user interactions, for example, a click, a drag, a swipe, a pinch-in/out, and a flick, may be applicable to the wallpaper 701 of the chat window.

In FIG. 7B, a process of switching the chat window to the search mode when the user selects a menu bar 702 displayed in a predetermined region of the chat window is illustrated. A shape and a position of the menu bar 702 may vary.

The user terminal 102 may express that the chat window has switched to the search mode in various manners after the chat window switches to the search mode. A search may be performed through a search word when the chat window switches to the search mode in response to the user interaction. In an example, when a keyword is input into the message input box 501 after the chat window switches to the search mode, the suggested search word list 502 may be displayed in conjunction with the message input box 501 as shown in FIGS. 5A and 5B.

Figure 8:
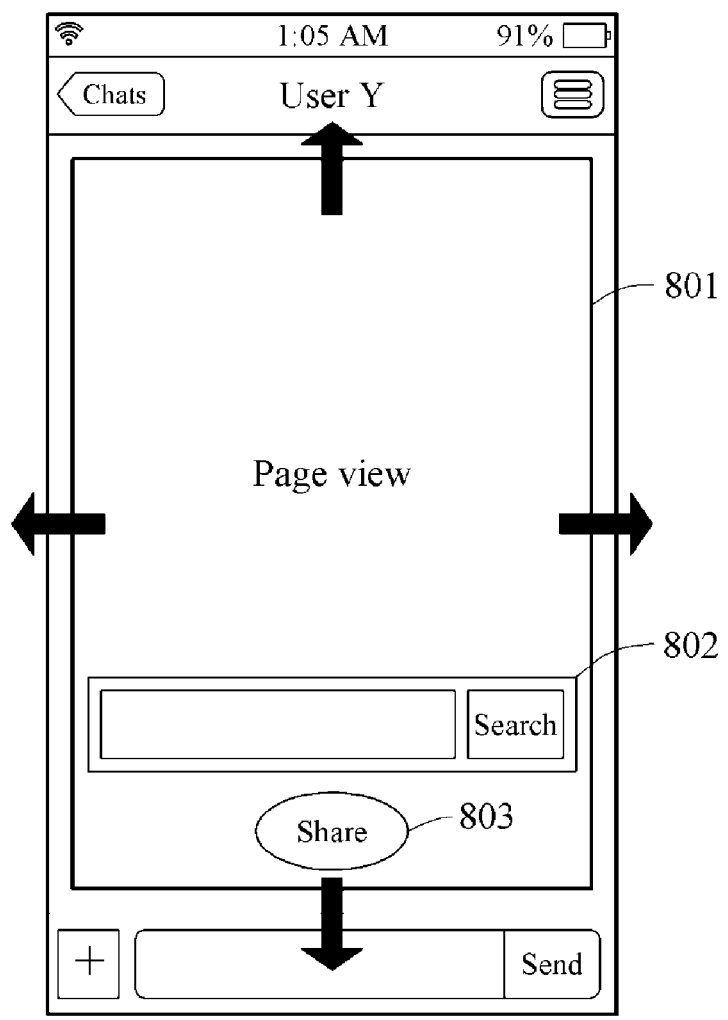
FIG. 8 illustrates a process of displaying a page view in a chat window according to an embodiment.

FIG. 8 illustrates a process of displaying a page view in a chat window according to an embodiment.

Referring to FIG. 8, the search server 104 may determine a plurality of items of search result data corresponding to a search word received from the user terminal 102. When the search server 104 transfers the plurality of items of search result data to the user terminal 102, the user terminal 102 may expose a page view 801 for each category mapped to the plurality of items of search result data. The search result data corresponding to the search word may refer to data obtained by processing search result pages found through a search for the corresponding search word in a search site. In detail, the search result data obtained by processing a link, a site description, and an image displayed on a search result page may be mapped to the page view 801, and the search result data may be provided to the user through the page view 801.

In detail, the page view 801 may correspond to a result of processing a search result page provided through a search site or a separate search application other than a message application. The page view 801 may be displayed through the message application into which the search word is input or through a separate browser interoperating with the message application. In embodiments, the page view 801 may be displayed within the message application providing the chat window, and may not be provided through another application. In another example, the page view 801 may be provided through another application interoperating with the message application providing the chat window. In this example, the message application may switch to the other application.

In an example, the search result data may include at least one of link information to access a page found using a search word and collected information crawled from at least one page. Such search result data may be classified by categories such as news, images, videos, blogs, cafés, books, shopping, and music, for example.

The page view 801 may be classified based on a category of each of the plurality of items of search result data. The search result data with respect to the search word may be classified by a plurality of categories. Here, the page view 801 currently displayed on a display of a user terminal may be mapped to a category of a search result page. In detail, search result pages of a search word "A" may be classified by categories, for example, "news, blogs, cafés, sites, images, and videos". In this example, the page view 801 currently displayed on the display of the user terminal through the message application or another application interoperating with the message application may be mapped to the category of the search result page. As described above, the search result page corresponding to a result of performing a search using the search word through a search site or a search application may not be mapped intactly to the page view 801. Instead, the search result data obtained by processing the search result page may be mapped to the page view 801, and the page view 801 may be displayed.

When a search request is made by inputting an instant message into a message input box or selecting a suggested search word from suggested search words in the suggested search word list, a page view 801 displayed first on the display of the user terminal 102 may correspond to a predetermined category among a plurality of categories corresponding to the search result data derived through the search word. Here, the predetermined category may be determined differently for each search word. In detail, for each search word, the search result mapped to categories may have different characteristics, for example, popularities, numbers of items, and selection ratios. Thus, the predetermined category corresponding to the page view 801 displayed first on the display of the user terminal 102 may be determined differently based on the search word.

The user terminal 102 may display page views 801 for each category mapped to the plurality of items of search result data corresponding to the search word. In this example, a page view 801 displayed on the display of the user terminal 102 may switch to a page view 801 corresponding to another category in response to a user interaction, for example, a swipe. Here, the meaning of "a page view 801 switches" is may be that a page view 801 currently displayed on the display of the user terminal 102 may change to another page view 801 mapped to a category determined based on a direction of the user interaction and the other page view 801 may be displayed on the display of the user terminal 102. In detail, when the page view 801 switches in response to the user interaction, a page view 801 corresponding to another category may be exposed.

A sequence of categories corresponding to page views may be determined differently based on a search word in response to the user interaction. For example, page views 801 with respect to a search word "A" may switch from one to another in a sequence of categories "news, sites, images, videos, blogs", whereas page views 801 with respect to a search word "B" may switch from one to another in a sequence of categories "blogs, cafés, images, books, apps".

The page view 801 may be an interface in a form of a card, for example, a card view, to which search result data is mapped so that the user may select search result data to be shared in the chatroom or to be displayed through a web browser, from items of search result data corresponding to a search word. In an example, the page view 801 may be generated by the search server 104 which derives the search result data or by the message server 101 which transfers the search result data.

In this example, the page view 801 may be displayed on an upper layer of the chat window. The page view 801 may include a search window 802 to perform an additional search in the search result data. The page view 801 may include a link, for example, a URL, to access a page corresponding to the search result data. The user may select the link and verify the search result data separately through a browser installed in the user terminal 102.

The page views 801 may switch from one to another through a user interaction such as a swipe. As described above, when the page views 801 switch from one to another, search result data belonging to different categories may be exposed. In embodiments, a page view currently displayed on the chat window in response to the user interaction may switch to a page view corresponding to search result data belonging to different categories, for example, videos, images, and blogs. A plurality of items of search result data may correspond to the search word. The user terminal 102 may display a group of search result data belonging to the same category through the page view, whereby the user may select search result data more conveniently through the page view 801.

In another example, page views corresponding to search result data derived using different search words may switch from one to another in response to a user interaction. Further, page views corresponding to search result data derived from different search servers with respect to a single search word may switch from one to another in response to a user interaction.

In addition, content of the page view 801 may change based on a parameter corresponding to a direction of a swipe. For example, when the swipe is performed in a leftward or rightward direction, a page view may switch to another page view corresponding to search result data for another category with respect to a single search word. When the swipe is performed in an upward or downward direction, a page view may switch to another page view corresponding to search result data with respect to another search word.

Further, as shown in FIG. 8, an interface 803 such as a button or a menu for the user to share at least one of a plurality of items of search result data mapped to the page view 801 in the chatroom may be displayed on the page view 801. The interface 803 may be displayed on the page view 801. The user may verify desired search result data through a swipe, and select the interface 803 such as the button or the menu for sharing in the page view 801 to which search result data desired to be shared in the chatroom is mapped. When the interface 803 is selected, the user terminal 102 may transfer a sharing request for the search result data mapped to the page view 801 to the message server 101.

In a case in which the search result data mapped to the page view 801 includes information related to a program to be executed in a web or app, a link to access the web or app where the program is to be executed may be displayed on the page view 801. Here, the web or app where the program is to be executed may be accessed by participants in the chatroom where the search word is obtained. The participants in the chatroom may execute the program through the web or app at the same time, and a result of executing the program may be shared in real time through the chatting window of the message application.

In this example, the sharing request for the search result data selected through the page view may be a request for sharing in at least one of a chatroom where the search request is made, another chatroom where the user is participating in a chat, another chatroom designated by the user, and a chatroom to be newly created.

Figure 10A:
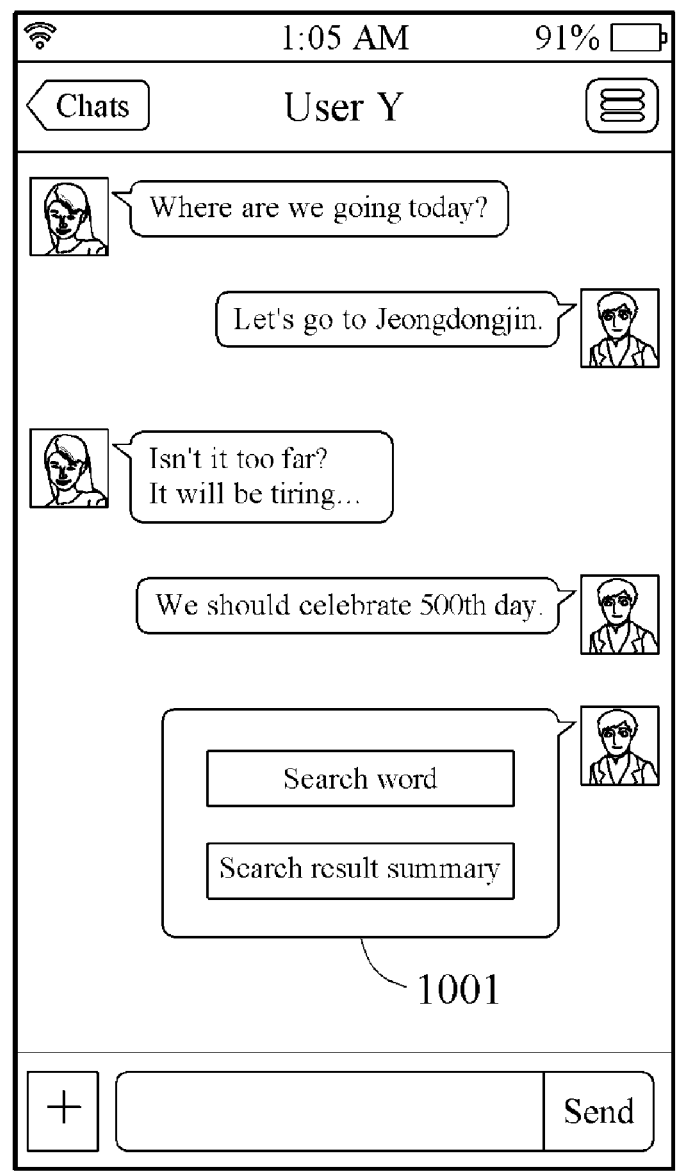
FIGS. 10A and 10B illustrate an example of displaying information related to search result data in a chat window according to an embodiment.
Figure 10B:
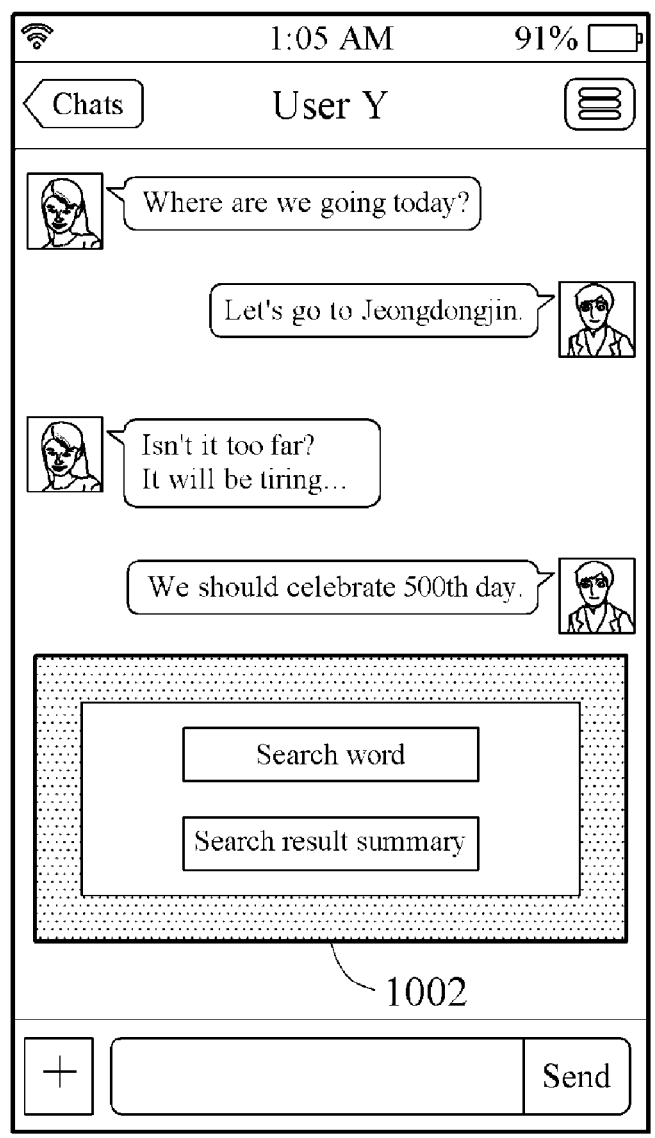

In a case in which the user makes a sharing request for a page view 801 corresponding to a predetermined category, a template including a search word and a search result summary obtained by additionally processing the search result data mapped to the page view 801 may be displayed in the chatroom, as shown in FIGS. 10A and 10B.

Figure 9:
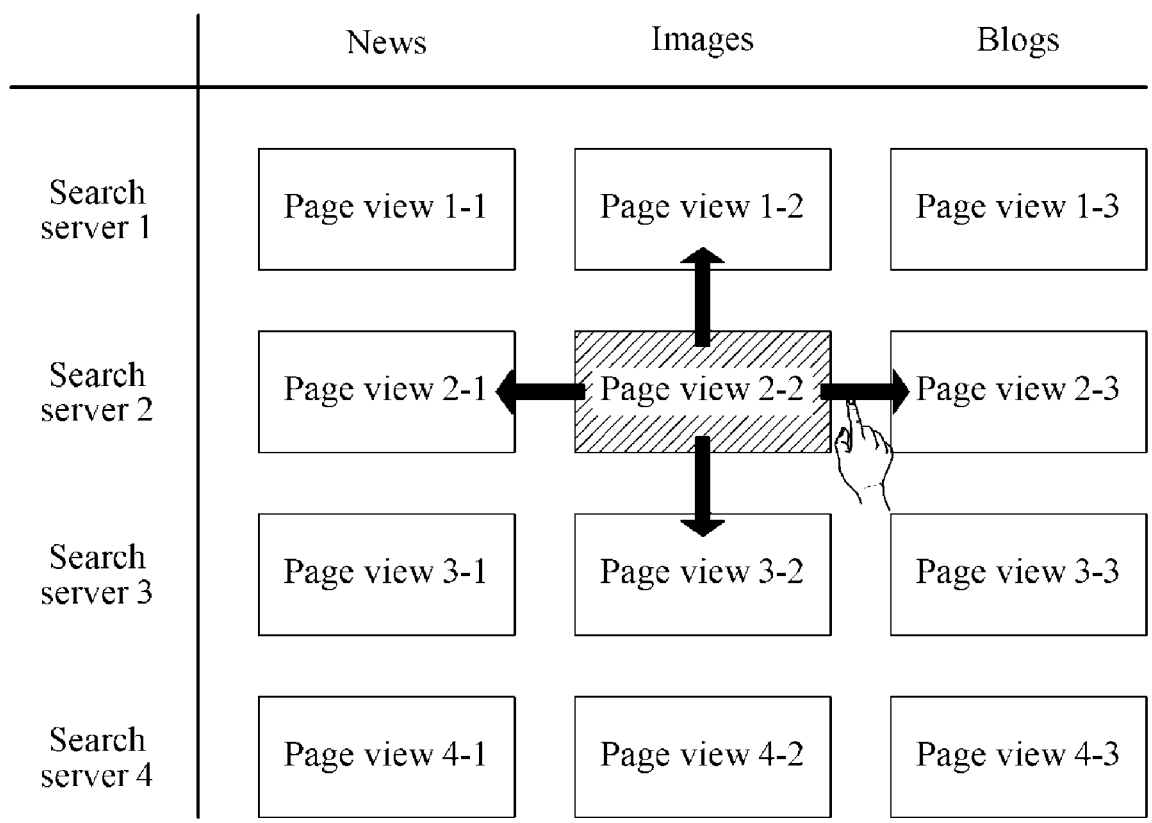
FIG. 9 illustrates a process of selecting search result data desired by a user by switching among page views according to an embodiment.

FIG. 9 illustrates a process of selecting search result data desired by a user by switching among page views according to an embodiment.

The user terminal 102 may map items of search result data derived from the search servers 104-1 through 104-N to page views for each category and display the page views. The page views may be exposed in a chatroom where the user terminal 102 is participating in a chat, and a user of the user terminal 102 may select desired search result data through the page views. Here, the search result data may be displayed intactly without processing or a result of processing the search result data may be displayed on the page views.

The search result data may include at least one of link information, for example, a URL, to access a web or app derived through a search word and collected information crawled from the web or app page. The search result data may be matched to categories, for example, news, images, videos, blogs, cafés, books, shopping, and music.

Here, a page view may refer to a display region configured to display search result data derived from a search word input into a message application in a form optimized for the message application. In detail, the page view may be provided in a form of a card corresponding to a whole region of the chatroom of the user terminal 102. A category of the page view may be determined based on a category of search result data to be displayed through the page view.

The user of the user terminal 102 may verify page views to which the plurality of items of search result data is mapped based on a category. Meanwhile, the user may determine whether at least one of the plurality of items of search result data mapped to the page views is to be shared. The user terminal 102 may transfer, to the message server 101, a sharing request for at least one item of the search result data selected through the page views.

Referring to FIG. 9, it may be assumed that a page view 2-2 corresponds to search result data derived through a search word obtained by the current user terminal 102. In addition, it may be assumed that the search result data corresponding to the page view 2-2 belongs to a category "images". In detail, a user may verify the page view 2-2 obtained by processing the search result data belonging to the category "images" with respect to the predetermined search word through a chat window.

In a case in which a plurality of items of search result data is provided, the page view 2-2 may be displayed to be divided based on a number of the items of the search result data. In another example, in a case in which a plurality of items of search result data is provided, the page view 2-2 may be displayed to be matched to a plurality of layers corresponding to the number of the items of the search result data. In detail, page views may be displayed on a plurality of layers respectively matched to the search result data in the chat window.

In this example, when the user swipes in a leftward direction from the page view 2-2, the user terminal 102 may switch from the page view 2-2 to a page view 2-1 and display the page view 2-1. The page view 2-1 obtained by processing search result data belonging to a category "news", among the search result data derived by a search server 2 through a predetermined search word, may be displayed in the chat window of the user terminal 102.

Similarly, when the user swipes in a downward direction from the page view 2-2, the user terminal 102 may switch from the page view 2-2 to a page view 3-2 and display the page view 3-2. The user terminal 102 may expose, in the chatroom, the page view 3-2 displaying search result data derived by a search server 3, other than the search server 2, using a predetermined search word.

In detail, the user may switch page views displayed in the chat window through a swipe, thereby easily verifying search result data belonging to different categories with respect to a predetermined search word or search result data derived from different search words or different search server.

In another example, when a plurality of items of search result data is provided, a page view may be divided into regions corresponding to the number of the items of the search result data. Each item of the search result data may be displayed in each of the divided regions of the page view. For example, in a case in which N items of search result data correspond to a category "images" with respect to a predetermined search word, the N items of search result data may be displayed in N regions divided from the single page view, respectively.

FIGS. 10A and 10B illustrate an example of displaying information related to search result data in a chat window according to an embodiment.

FIG. 10A illustrates a process of displaying search result data mapped to a page view for which a user makes a sharing request through a speech bubble. FIG. 10B illustrates a process of displaying the search result data through a template distinct from the speech bubble. In FIGS. 10A and 10B, the speech bubble and the template may refer to interfaces configured to display the search result data obtained through the search word in a form optimized for the chat window. In detail, a search result summary obtained by additionally processing the search result data displayed through the page view may be displayed through the interface such as the template or the speech bubble in the chat window. In this example, the speech bubble and the template may adaptively change based on a size of a display or a chat window where a message application is executed.

When a sharing request is made with respect to the search result data mapped to a page view as illustrated in FIG. 8, the message server 101 may transfer the search result data to the user terminal 102 and a target terminal with which the search result data is to be shared. The target terminal may be designated by the user.

The user terminal 102 may identify a type of the search result data received from the message server 101. The type of the search result data may indicate whether the search result data includes a text, an image, a video, a link, or a combination of at least two thereof.

In a case in which the type of the search result data indicates whether the search result data includes a text, an image, a video, a link, or a combination of at least two thereof, information related to the search result data may be displayed through a speech bubble or a template determined based on the type of the search result data in the chat window. Here, the information related to the search result data may include summary data including at least one of a title, a representative image, and a description of the search result data.

In a case in which the search result data includes a link to access found information, the user terminal 102 may transfer the information related to the search result data or the link to the clipping server 105.

In a case in which a single item of search result data is derived, a form of a speech bubble or a template where the search result data is to be displayed may be link-type, text-type, image-type, video-type, or combined type based on a type of the search result data.

In a case in which a plurality of items of search result data is derived, a form of a speech bubble or a template where the search result data is to be displayed may be list-type. List-type may refer to a type in which a plurality of items of search result data determined to be of one of the link type, the text-type, the image-type, the video-type, and the combined type is expressed in a list. In this example, each list in the list-type speech bubble or template may include summary data related to the search result data. The summary data may include, for example, at least one of a title, a brief description, and a representative image of a page.

The user terminal 102 may display information related to the search result data based on the form of the speech bubble or the template of one of the list-type, the text-type, the image-type, the video-type, and the combined type.

In this example, in a case in which the form of the speech bubble or template is determined to be the link-type based on the type of the search result data, the user terminal 102 may transfer the link information to the clipping server 105. The clipping server 105 may access a page based on the link information. The clipping server 105 may obtain clip information related to the page by clipping the page.

As described with reference to FIG. 4, the clipping server 105 may obtain the clip information which is derived by analyzing the page corresponding to the search result data, obtained from metadata of the page corresponding to the search result data, or derived by snapshotting a whole or a portion of the page corresponding to the search result data.

In addition, the user terminal 102 may transfer, to the clipping server 105, at least one of the search result data, the type of the search result data, information related to a size of the display of the user terminal 102, information related to the message application, and detailed information related to a chatroom where the search result data is to be shared. The detailed information related to the chatroom may include a chatroom ID, and information regarding whether the chatroom corresponds to a 1:1 chatroom or a group chatroom.

The clipping server 105 may access a web or app through the link and crawl the page intactly. The clipping server 105 may obtain the clip information including at least one of the title, the description, and the representative image of the page by analyzing an HTML of the page. In another example, the clipping server 105 may obtain the clip information related to the page from the metadata of the page. The clipping server 105 may obtain an image obtained by snapshotting a whole or a portion of the page as the clip information.

The clipping server 105 may transfer, to the user terminal 102, the clip information as the information related to the search result data. The user terminal 102 may display the clip information related to the page as the information related to the search result data in the chatroom through the speech bubble of FIG. 10A or the template of FIG. 10B. The information related to the search result data displayed in the chatroom may include summary data including at least one of the title, the representative image, and the description of the search result data. In detail, the search result data may be processed to be in a customized form, for example, the speech bubble or the template, and displayed in a chatroom where sharing of the search result data is requested.

Meanwhile, the user terminal 102 may display, in the chatroom, the search word used to obtain the search result data along with the information related to the search result data through the speech bubble or the template. In doing so, the user may easily verify a search word used to derive the information related to the search result data displayed through the speech bubble or the template.

When the user selects the speech bubble or the template, the user terminal 102 may newly execute a browser or switch from the message application to a browser already being executed, and provide the page related to the search result data through the browser.

An example in which the user terminal 102 transfers a sharing request for the search result data and verifies the type of the search result data is described above. However, in an example, the user terminal 102 may verify the type of the search result data in advance, and transfer, to the message server 101, the sharing request for the search result data and information related to the type of the search result data.

In an example, the counterpart terminal 103 configured to display the information related to the search result data may verify the type of the search result data. In another example, the message server 101 may verify the type of the search result data by analyzing the search result data. The message server 101 may transfer the search result data and the type of the search result data to a participant terminal in the chatroom where sharing of the search result data is requested.

FIG. 11 is a diagram illustrating a process of providing information related to a web or app where a program is to be executed according to an embodiment.

In operation 1101, the user terminal 102 may obtain, a search word including a whole or a portion of an instant message input into a message input box or a suggested search word selected from suggested search words in a suggested search word list displayed in conjunction with the message input box.

In operation 1102, the user terminal 102 may transmit the search word to the search server 104 through a search request. In this example, the user terminal may transfer the search word to the search server 104 through the message server 101 or directly to the search server 104. The search server 104 may extract a plurality of items of search result data based on the search word. In this example, the search server 104 may determine whether the search result data is associated with a program executable through a web or app. For example, the search server 104 may determine whether information related to the program is included in the search result data. The information related to the program may include, for example, news, an article, a link to download/install the program, an introduction page of the program, and a category of the program.

In a case in which the information related to the program executable through the web or app is included in the search result data, the search server 104 may request the information related to the program executable through the web or app to a program server 106 associated with the program, in operation 1103.

Meanwhile, the search server 104 may transfer, to the program server 106, information related to a chatroom where the search word is input or information related to participants in the chatroom when requesting the information related to the program to the program server 106.

Here, the information related to the chatroom may include at least one of identification information related to the chatroom, for example, a chatroom ID, link information related to the chatroom, a creator of the chatroom, a type of the chatroom, for example, a 1:1 chatroom or a group chatroom, a number of participants in the chatroom, and information related to messages exchanged between the participants in the chatroom. The information related to the participants in the chatroom may include identification information of the participants, ages of the participants, genders of the participants, locations of the participants when participating in a chat, and propensity information of the participants. The identification information of the participants may include, for example, participant IDs, phone numbers of the participants, and e-mail addresses of the participants. In this example, the participants may also include a user of the user terminal 102 who inputs the search word.

In operation 1104, the program server 106 may transfer the information related to the program to the search server 104. In operation 1105, the search server 104 may transfer the information related to the program to the user terminal 102. The program server 106 may generate the information related to the program based on the information related to the chatroom or the information related to the participants in the chatroom. Here, the information related to the program may include information related to the web or app where the program is to be executed. Unlike the foregoing, the information related to the chatroom or the information related to the participants in the chatroom may be utilized for the user terminal 102 to display the web page or execute the app, rather than being transferred to the program server 106.

Unlike operations 1104 and 1105, in operation 1106, the program server 106 may transfer the generated information related to the program directly to the user terminal 102, rather than through the search server 104.

In operation 1107, the user terminal 102 may display a page view to which the information related to the program is mapped. In operation 1108, the user terminal 102 may transfer a sharing request for the program to the message server 101. In operation 1109, the message server 101 may transfer the information related to the web or app where the program is to be executed to the user terminal 102 and a terminal of another participant in the chatroom which the user of the user terminal 102 entered.

In operation 1110, the user terminal 102 may display the web page where the program is to be executed, in the chatroom through the message application based on the information related to the web, or display a web browser separate from the message application. The user terminal 102 may provide the app where the program is to be executed based on the information related to the app where the program is to be executed. In this example, the web browser may be an in-app browser directly interoperating with the message application, or an out-app browser independent from the message application.

Unlike the example of FIG. 11, the user terminal 102 may provide the web page where the program is to be executed, or execute the program through the app based on the information related to the program received through operation 1105 or 1106, without performing operations 1107, 1108, and 1109.

In an example, the descriptions provided with reference to FIG. 11 may extend based on cases defined below. Meanwhile, in the example of FIG. 11, the web or app where the program is to be executed may refer to a web or app accessible or executable by the user terminal 102 or the counterpart terminal 103 participating in the chat in the chatroom where the search word is input.

In this example, the chatroom may be classified as a 1:1 chatroom or a group chatroom. Thus, the program may be an application where at least two people participate. For example, the program may include a game program, an education program, and a video call program executable by a plurality of participants entering the chatroom.

The same web or app where the program is to be executed may be provided to each of the plurality of participants entering the chatroom. Accordingly, the plurality of participants entering the chatroom may share a result of executing the program.

In an example, there may be a case A in which the search word input into the message application directly indicates the program and a case B in which the search word input into the message application indicates a type or a category of the program. In detail, a case in which the search word obtained through a chat window or a message input box of the message application corresponds to a title, for example, a name including an abbreviation, of the program may correspond to the case A.

For example, in a case in which the search word is "Omok", the program corresponding to the search word may be an "Omok" game like the case A. In this example, participant information may be used to configure a web or app where the program corresponding to the "Omok" game is to be executed. In detail, in a case in which participants in the chatroom are a user A who inputs the search word and a user B who is a counterpart, the search result data corresponding to the search word may be information related to a web or app where an "Omok" game for a match between the user A and the user B is to be executed automatically based on information related to the participants in the chatroom. In this example, in a case in which the search word is "Omok" for a 1:1 match and four participants are in the chatroom, an execution page with respect to two different "Omok" games may be displayed in the chatroom for all the participants in the chatroom to participate in the games, or an execution page where two participants participate in a single "Omok" game and the other two watch the match may be displayed in the chatroom.

Meanwhile, in a case in which the search word is "game", the program may be an unspecified "game" program like the case B. In this example, to provide a web or app where the program is to be executed to the user terminal 102, the program needs to be specified. Information related to participants in the chatroom where the search word is input may be utilized to specify the program. For example, in a case in which four participants are in the chatroom, a game program that the four participants may play, for example, a ladder game program or a card game program, among game programs, may be determined based on a preset algorithm or a selection of a user who inputs the search word.

In another example, there may be a case I in which the search word includes a name of the program, and a case II in which the search word includes a name of the program and an execution instruction of the program. In a case in which the search word includes only "Omok" like the case I, link information to access a web or app where the program corresponding to the "Omok" game is to be executed may be displayed in a page view including a result of searching "Omok", as described with reference to FIGS. 2 through 11. In a case in which the search word includes only "Omok" like the case I, the web or app where the program corresponding to the "Omok" game is to be executed may be generated through the program server 106, but may not be immediately displayed through the user terminal 102. In this example, only link information to access the web or app where the program corresponding to the "Omok" game is to be executed may be provided.

In a case in which the search word is a combination of the name of the program and the execution instruction of the program, for example, "Omok+start now (run now)" like the case II, the web or app where the program corresponding to the "Omok" game is to be executed may be displayed directly through the user terminal 102. In this example, the web or app where the program corresponding to the "Omok" game is to be executed may be provided in the chat window into which the search word is input or may be provided through a web browser interoperating with or independent from the message application.

Figure 12:
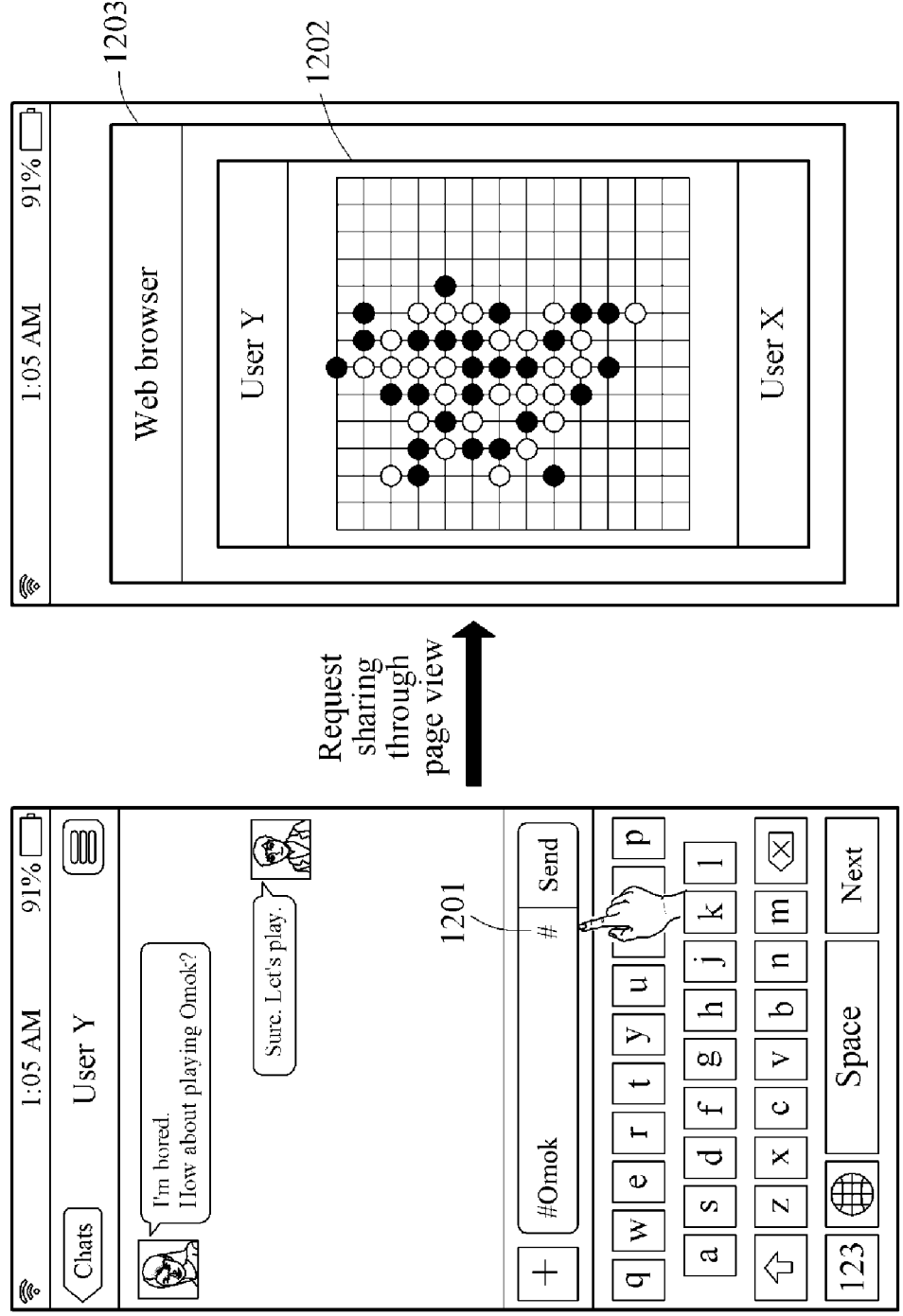
FIG. 12 illustrates an example of displaying a web page where a program is to be executed through a web browser by inputting a search word into a message application according to an embodiment.

FIG. 12 illustrates an example of displaying a web page where a program is to be executed through a web browser by inputting a search word into a message application according to an embodiment.

Referring to a screenshot on the left side of FIG. 12, an identifier 1201 to switch a message application from a chat mode to a search mode is displayed in a message input box displayed in a chat window. When a user selects the identifier 1201 as shown in FIG. 6A, the message application may switch from the chat mode to the search mode. In embodiments, a "send" button in the message input box may be changed to a "search" button, or changed into an image related to "search", for example, a magnifying glass icon.

Meanwhile, when the message application switches from the chat mode to the search mode, a character # related to the search mode may be provided as a default in the message input box. In this example, the character related to the search mode may be a symbol or a character including at least one word designated separately by the user or the message application.

In another example, the message application may automatically switch to the search mode when the user directly inputs an identifier such as a hash tag # into the message input box, rather than switching the message application to the search mode by selecting the identifier 1201 separately.

Further, as shown in FIG. 6B, irrespective of switching to the search mode, when the user selects an identifier related to a search request after inputting an instant message into the message input box, the user terminal 102 may transfer the search request to set the instant message as the search word to the search server 104.

In this example, in a case in which the user inputs a search word "Omok" into the message input box, the user terminal 102 may display, through a web browser 1203, a web page 1202 where a program corresponding to an "Omok" game, the program distinct from the message application, is to be executed, as shown in a screenshot on the right side of FIG. 12. The same web page 1202 where the program corresponding to the "Omok" game is to be executed may be shared between participants participating in a chat in a chatroom, and a result of executing the program corresponding to the "Omok" game may be updated in real time. Unlike the screenshot on the right side of FIG. 12, the web page 1202 where the program corresponding to the "Omok" game is to be executed may be displayed in the chat window into which the search word is input.

In the screenshot on the left side of FIG. 12, it may be assumed that participants in the chatroom are a user X and a user Y. Here, the user X may be a user who inputs a search word into the message input box. In the screenshot on the right side of FIG. 12, the web page 1202 where the program corresponding to the "Omok" game is to be executed may be generated in view of the participants in the chatroom based on information related to the chatroom where the search word is input. In detail, as shown in the web page 1202 where the program corresponding to the "Omok" game is to be executed, the user Y may be determined to automatically participate in the "Omok" game. In this example, the program may be executed through a web page, without the necessity of being installed in a user terminal owned by the user Y.

In an example, the program may need to be installed in the user terminal before executed. In this example, in a case in which the program is yet to be installed in the user terminal 102 when displaying a web page where the program is to be executed, a process of installing the program may be performed first.

The program corresponding to the "Omok" game may refer to a program corresponding to the search word input into the message input box. The web page where the program corresponding to the "Omok" game is to be executed may be exposed through a web browser or a chat window of the message application. Further, the web page where the program corresponding to the "Omok" game is to be executed may not be directly exposed in the chat window. Only link information to access the web page where the program corresponding to the "Omok" game is to be executed may be exposed. In another example, the user terminal 102 of the user X who inputs the search word may display the web page where the program corresponding to the "Omok" game is to be executed, whereas the counterpart terminal 103 of the user Y who is a participant entering the same chatroom where the user X is present may expose only link information to access the web page rather than directly displaying the web page where the program corresponding to the "Omok" game is to be executed.

FIG. 12 illustrates the process of providing the web page where the program is to be executed. However, the same descriptions may also be applicable to a case in which the program is to be provided through an app. As described with reference to FIG. 11, before the web page where the program is to be executed is provided, a page view reflecting information related to the program may be displayed through the user terminal 102, and the web page may be provided at a sharing request through the page view.

Figure 13:
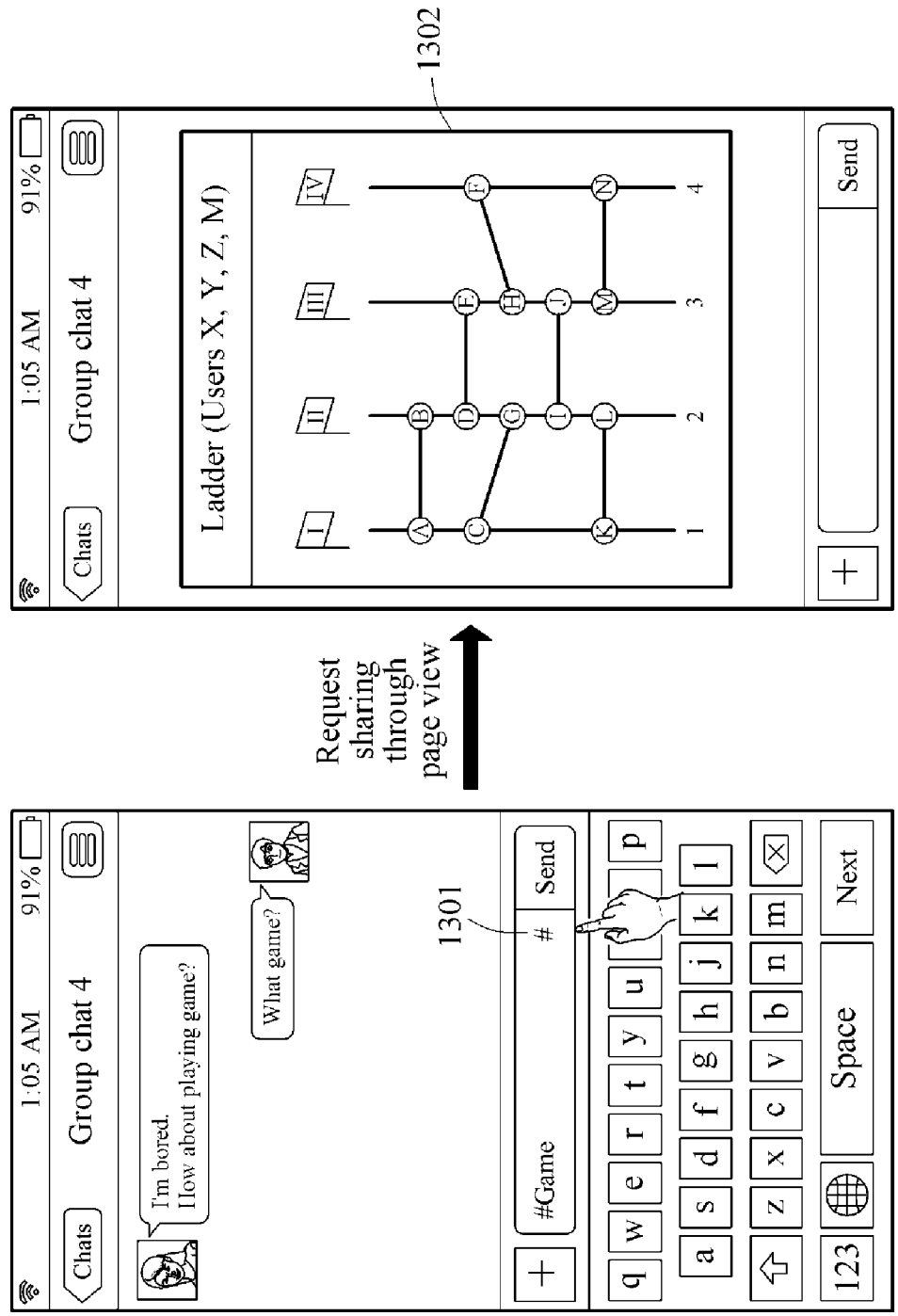
FIG. 13 illustrates an example of displaying a web page where a program is to be executed through a message application by inputting a search word into the message application according to an embodiment.

FIG. 13 illustrates an example of displaying a web page where a program is to be executed through a message application by inputting a search word into the message application according to an embodiment.

Referring to a screenshot on the left side of FIG. 13, an identifier 1301 to switch a message application from a chat mode to a search mode is displayed in a message input box displayed in a chat window. When a user selects the identifier 1301, the message application may switch from the chat mode to the search mode.

In this example, in a case in which the user inputs a search word "game" into the message input box, a web page 1302 where a ladder game distinct from the message application is to be executed may be displayed in the chat window, as shown in a screenshot on the right side of FIG. 13. Unlike the example of FIG. 12, the screenshot on the left side of FIG. 13 corresponds to a case in which a type or a category of the program is input as the search word, rather than a case in which a title, for example, a name including an abbreviation, of the program is input as the search word.

In this example, to specify the program, participant information related to participants entering the chatroom may be utilized when the search word is input into the message input box. In the example of FIG. 12, since the program is already specified through the search word, information related to the participants in the chatroom may be utilized to set the participant information in the web page where the program is to be executed. However, in the example of FIG. 13, the program corresponding to the search word may be specified through the search word and the information related to the participants in the chatroom.

In the screenshot on the left side of FIG. 13, although a search word "game" is input into the message input box, at least one game program corresponding to the participant information may be automatically determined among game programs based on the search word and the information related to the participants in the chatroom. As shown in the screenshot on the left side of FIG. 13, in a case in which four participants are in the chatroom, at least one game program in which all of the four participants in the chatroom may participate may be extracted from game programs corresponding to the search word. As shown in the screenshot on the right side of FIG. 13, a "ladder game" program in which all of the four participants may participate may be specified as the program corresponding to the search word by the user who inputs the search word.

As shown in the screenshot on the right side of FIG. 13, the web page 1302 where the "ladder game" program corresponding to the search word is to be executed may be displayed in the chat window where the search word is input. However, in an example, the web page 1302 where the "ladder" game program is to be executed may be displayed through a web browser interoperating with or separate from the message application.

FIG. 13 illustrates the process of providing the web page where the program is to be executed. However, the same descriptions may also be applicable to a case in which the program is to be provided through an app. As described with reference to FIG. 11, before the web page where the program is to be executed is provided, a page view reflecting information related to the program may be displayed through the user terminal 102, and the web page may be provided at a sharing request through the page view.

According to an embodiment, it may be possible to perform a search through a message application where a chat is being performed, without switching from the message application to another application for a keyword search.

According to an embodiment, it may be possible to enable a user to select necessary search result data more conveniently by providing a result of processing search result data derived through a search word, rather than providing the search result data intactly.

According to an embodiment, it may be possible to display search result data derived through a search word in a form optimized for a chat window by displaying information related to the search result data through a speech bubble used to exchange a message in a chatroom or a template distinct from the speech bubble.

According to an embodiment, it may be possible to access a program more conveniently through a message application by displaying a web or app where a program is to be executed as a result of searching a search word through the message application or a web browser, in a case in which the search word associated with the program is input while a chat is being performed in a chatroom through the message application.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of operating a messenger application installed on a user terminal, the method comprising:
   sending, to a remote server, a search request from the messenger application;
   in response to the search request, receiving search result data for organizing a plurality of page views as if the plurality of page views are arranged in an array such that one of the plurality of page views is displayed on the messenger application and the rest of the plurality of page views are not displayed on the messenger application and further such that the plurality of page views of the array are navigable by one or more user commands onto the messenger application for selecting another of the plurality of page views for displaying on the messenger application;
   wherein each of the plurality of page views includes search results and corresponds to one of a plurality of predetermined categories such that a set of search results included in one of the plurality of page views belongs to one of the predetermined categories that corresponds to the particular page view including the set of search results;
   subsequent to receiving search result data, displaying a first one of the plurality of page views on the messenger application without opening a mobile browser application such that the first page view includes a first set of search results that belong to a first predetermined category;
   wherein a second one of the plurality of page views is not displayed concurrently with the first page view and is immediately next to the first page view in a first direction in the array of the plurality of page views, wherein the second page view includes a second set of search results that belong to a second predetermined category different from the first predetermined category;
   receiving a first user command for navigating in the array to the first direction while the first page view is displayed on the messenger application; and
   in response to the first user command, switching from displaying the first page view to displaying the second page view on the messenger application.

2. The method of claim 1, wherein the first command comprises swiping on a display screen of the user terminal for navigating to the first direction in the array.

3. The method of claim 1, wherein the message application is configured to switch between a chat mode and a search mode in response to a user input in a chat room of the messaging application.

4. The method of claim 1, wherein upon receipt of an input of a predetermined character followed by an input of texts and further followed by a send command, the message application causes a search using the inputted texts.

5. The method of claim 1, wherein upon receipt of an input of texts followed by a search command, the message application causes a search using the inputted texts.

6. The method of claim 1, wherein the first page view is shared in a chat room of the messaging application in response to a share request made while the first page view is displayed on the message application.

7. The method of claim 6,
   wherein the first page view is shared a speech bubble or a template distinct from the speech bubble in the chatroom.

8. The method of claim 1, wherein the search result comprises at least one of a title, an image, and a description for the first page view.

9. The method of claim 1, further comprising:
   recognizing an input of an identifier corresponding to the remote server while a user is inputting an instant message into a message input box of a message application or after the instant message input into the message input box is reflected in a chat history,
   wherein the search request is sent to the remote server based on the identifier.

10. A user terminal comprising:
    at least one processor; and
    at least one memory storing instructions that cause the user terminal to perform the method of claim 1.

* * * * *